United States Patent
Martin

(10) Patent No.: US 7,504,996 B2
(45) Date of Patent: Mar. 17, 2009

(54) SATELLITE-BASED POSITIONING RECEIVER WITH IMPROVED INTEGRITY AND CONTINUITY

(75) Inventor: Nicolas Martin, Bourg-les-Valence (FR)

(73) Assignee: Thales, Neuilly/sur/Seine (FR)

( * ) Notice: Subject to any disclaimer, the term of this patent is extended or adjusted under 35 U.S.C. 154(b) by 0 days.

(21) Appl. No.: 11/814,409

(22) PCT Filed: Jan. 3, 2006

(86) PCT No.: PCT/EP2006/050014

§ 371 (c)(1),
(2), (4) Date: Jul. 20, 2007

(87) PCT Pub. No.: WO2006/077174

PCT Pub. Date: Jul. 27, 2006

(65) Prior Publication Data

US 2008/0129586 A1    Jun. 5, 2008

(30) Foreign Application Priority Data

Jan. 20, 2005 (FR) .................................. 05 00592

(51) Int. Cl.
*G01S 1/00* (2006.01)

(52) U.S. Cl. ................................................. 342/357.12
(58) Field of Classification Search ............ 342/357.01, 342/357.03, 357.06, 357.12, 357.14; 701/207, 701/213
See application file for complete search history.

(56) References Cited

U.S. PATENT DOCUMENTS

| | | | |
|---|---|---|---|
| 6,263,281 B1 * | 7/2001 | Yamamoto et al. | 701/215 |
| 2004/0135721 A1 | 7/2004 | Hoven et al. | |
| 2004/0138813 A1 | 7/2004 | Syrjarinne | |
| 2004/0239560 A1 * | 12/2004 | Coatantiec et al. | 342/357.14 |

OTHER PUBLICATIONS

Mark L. Psiaki, Hee Jung: "Extended Kalman Filter Methods for Tracking Weak GPS Signals"; ION GPS 2002, Sep. 27, 2002, pp. 2539-2533, XP002340141; Portland, OR.
Nesrenn I. Ziedan, James L. Garrison: "Extended Kalman Filer-Based Tracking of Weak GPS Signals under High Dynamic Conditions"; ION GNSS 17th International Meeting of the Satellite Division, Sep. 24, 2004, pp. 20-31, XP002340142, Long Beach, CA.

* cited by examiner

*Primary Examiner*—Dao L Phan
(74) *Attorney, Agent, or Firm*—Lowe Hauptman Ham & Berner, LLP

(57) ABSTRACT

The invention relates to a receiver of signals of a satellite-based radionavigation system intended to calculate the position of a carrier very precisely. The receiver comprises several digital signal processing channels each associated with a satellite and each providing a first digital datum representing a pseudo-distance between the receiver and the satellite in the form of an instantaneous temporal position of a pseudo-random code and a second digital datum representing this pseudo-distance in the form of an instantaneous phase of the carrier of the signal transmitted by the satellite. According to the invention, the receiver comprises an extended Kalman filter. The Kalman filter for calculates an instantaneous position of the receiver, means for calculates propagation of a state vector, calculates registration of the state vector on the basis of observations relating to each satellite and of a matrix of observations. The Kalman filter calculates observation and calculates an estimated instantaneous pseudo-distance for each satellite.

20 Claims, 7 Drawing Sheets

SATELLITE-BASED POSITIONING RECEIVER WITH IMPROVED INTEGRITY AND CONTINUITY

CROSS-REFERENCE TO RELATED APPLICATIONS

The present Application is based on International Application No. PCT/EP2006/050014, filed on Jan. 3, 2006, which in turn corresponds to French Application No. 05/00592 filed on Jan. 20, 2005, and priority is hereby claimed under 35 USC §119 based on these applications. Each of these applications are hereby incorporated by reference in their entirety into the present application.

FIELD OF INVENTION

The invention relates to a signal receiver for a satellite-based radionavigation system intended to calculate the position of a carrier very precisely. The best known system, which will be referred to hereinafter, is the GPS system, and satellite-based radionavigation systems will be designated under the generic term GPS even though they are similar systems such as Galileo or Glonass.

BACKGROUND OF THE INVENTION

The GPS system uses a constellation of satellites which rotate about the earth in very precisely determined orbits, that is to say the position of an arbitrary satellite can be ascertained at any instant. The orbits of the satellites are chosen in such a way that at any time, 6 to 12 satellites are visible at any point of the earth. Each satellite transmits two radioelectric signals of frequencies $L_1$ (1575.42 MHz) and $L_2$ (1227.6 MHz). On the ground or on a vehicle on land, sea or in the air, a GPS receiver receives the signals transmitted by visible satellites.

The onboard GPS receiver measures the duration of propagation required in order for a time mark transmitted by a satellite to reach it. The time marks are coded on carrier waves by the phase modulation technique. Each satellite thus transmits its own pseudo-random code. A replica of the sequence of the code is generated by the receiver and the shift that the replica must undergo so as to coincide with the code received corresponds to the duration of propagation of the signal in order to travel the satellite-receiver distance. This duration multiplied by the speed of light in the medium traversed gives a distance measurement called a pseudo-distance. On the basis of the measurements of the pseudo-distances separating it from each visible satellite, and of the knowledge of the position of the satellites, the receiver deduces its precise position in latitude, longitude, and in altitude in a terrestrial reference frame by a numerical resolution procedure akin to triangulation. It can also deduce therefrom the date and the precise time in the temporal reference frame of the GPS system.

The time reference of the receiver, provided by its clock, does not coincide perfectly with the time reference of the satellites of the constellation; this induces a bias in the measurements of propagation time, therefore of distance, that is equal to the delay of the time reference of the receiver with respect to the time reference of the satellites. The term "pseudo-distance" is employed for this purpose. The time bias, common to all the measurements, constitutes a fourth unknown, in addition to the three position unknowns, and this makes it necessary to have at least four measurements to calculate the position.

Furthermore, the position of the receiver is estimated by making a certain number of approximations. The measurement of the pseudo-distance cannot for example circumvent the system-related errors such as the lack of precision of the ephemerides or clocks onboard the satellites. The measurement of the pseudo-distance is also marred by errors related to the interactions between the signals and the atmospheric layers that they pass through. The signal propagation delay in the troposphere and the ionosphere is dependent on the inclination of the path and the time at which it takes place. Typically, GPS positioning errors related to the atmosphere are more marked by day than at night and more sensitive when a satellite is close to the horizon than the zenith. In certain applications such as for example a precision approach in aeronautics, the positioning precision obtained by a direct (or absolute) measurement of the pseudo-distance is not sufficient.

The use of a differential measurement makes it possible to substantially improve the precision of the positioning. It consists in transmitting, via a dedicated channel (VHF, UHF or cellular telephony), corrections of the pseudo-distance measurements formulated on the basis of pseudo-distance measurements originating from receivers disposed in ground stations and whose positions are very precisely known and close to the onboard receiver. The measurement of the pseudo-distance separating a ground receiver and a satellite is compared with the theoretical distance separating these two devices. The theoretical distance is calculated on the basis of the respective spatial coordinates of the ground receiver and of the satellite which are known at any instant. The difference between the distance measurement and the theoretical distance represents the measurement error, it is calculated for each satellite at each observation epoch. These distance differences constitute corrective terms (also called differential corrections) which are deducted from the pseudo-distance measurements carried out by the mobile receiver. These corrections have the effect of almost totally removing the errors which exhibit a significant spatial correlation whatever their origin, "system" or "atmospheric". The corrections are all the more effective the closer the two receivers. However, the differential measurement does not eliminate the errors related to the reflections of the signal on objects that are close to the antenna of the receiver, nor the errors specific to the receiver (thermal noise). These errors are present in the reference receiver as well as in the onboard receiver, they degrade the positioning measurement during differential correction; the precision obtained is of the order of a few meters.

To improve the positioning precision, the ground receivers and carrier-borne mobile receivers, can also exploit a second cue formulated by the receiver which is the measurement of the phase of the carrier, for each satellite signal received. The measurement of the instantaneous phase of the carrier received actually makes it possible to calculate a pseudo-distance, termed the carrier pseudo-distance, between the receiver and the satellite, in the same way as the measurement of the instantaneous phase of the pseudo-random code. This carrier pseudo-distance undergoes the same variations as the code pseudo-distance, when the distance between the receiver and the satellite or the time bias due to the clock of the receiver vary. This pseudo-distance measured by the phase is a priori ambiguous since the phase is known modulo $2\pi$ but it is much less noisy than the code pseudo-distance measurements.

A known solution for improving pseudo-distance measurements consists in smoothing the noisy pseudo-distance measurement carried out on the code by the not very noisy phase measurements. For this purpose the receiver applies a low-pass filter to the difference between the code pseudo-distance and carrier pseudo-distance measurements, then adds this filtered difference to the carrier pseudo-distance measurement so as to reconstitute the code phase measurement. This processing is carried out satellite axis by satellite axis. If the measurement is differential, an identical smoothing is applied to the receivers of the ground station so that the tracking error of the low-pass filter, due to the divergence between the code and the carrier related to the fluctuations in the ionospheric delay, is identical on the ground and in the mobile receiver, and does not disturb the positioning measurement after application of the correction.

This solution represents the state of the art of the architecture of satellite navigation systems. Its main benefit lies in its simplicity and in the absence of any coupling effect between the measurements of the pseudo-distances of the various satellites (channels), nevertheless it is not completely satisfactory. Specifically, the gain in measurement precision is significant only when the smoothing is performed with a long time constant; and in this case, the duration of reinitialization to recover precision after an abrupt modification of all the available measurements (for example disappearance of a satellite by masking, failure of a satellite or else failure of a ground receiver in the case of differential GPS) is also long. It would be desirable to avoid this drawback.

Moreover, to quantify the integrity of the position measurement in applications where integrity is critical, such as aeronautical applications, a parameter called the position measurement "protection radius" is used. The protection radius corresponds to a maximum position error for a given probability of an error occurring. That is to say, the probability that the position error exceeds the stipulated protection radius is less than this given probability value. The calculation is based on two types of error which are on the one hand normal measurement errors and on the other hand errors caused by an operating anomaly in the constellation of satellites, by a failure of a satellite or else a failure of a ground receiver.

Commonly, two feared types of event that may arise with a GPS positioning system may be distinguished: the first, dubbed non-continuity, corresponds to an unplanned but declared degradation in the service; the second, called non-integrity, corresponds to an erroneous but undeclared position measurement, whose appearance is that of a reliable measurement. A non-continuity can correspond for example to the occurrence of an alarm indicating the supposed presence of a failure. In both cases the consequences can be serious, hence the necessity to minimize the probability of such events. A protection radius calculation can be estimated for a non-continuity probability value and a non-integrity probability value that are given a priori. In this case the probability that the positioning error exceeds the radius will be less than the given non-integrity probability, and the probability of alarm (justified or unjustified) will be less than the given non-continuity probability.

For example, in the case of existing systems which are based on smoothing, axis by axis, the pseudo-random code position measurements by the phase variations of the carrier, the protection radius degrades abruptly as a satellite disappears and takes a long time to regain an acceptable value after the satellite reappears, because of the response time of the smoothing filter. It would be desirable to find a solution which avoids this drawback. The invention is aimed in particular at minimizing this deterioration.

SUMMARY OF THE INVENTION

The present invention alleviates the drawbacks of the solutions presented above. It is aimed at improving the precision of the position measurement by using in a new way the two simultaneous pseudo-distance measurements made available by each satellite while according the position thus obtained better robustness in relation to abrupt degradations in the geometry of the satellites (transient regime) that it might encounter, doing so both in respect of absolute positioning and in respect of differential positioning.

For this purpose, the invention is aimed at a satellite-based positioning receiver, comprising several digital signal processing channels intended each to be associated with a respective satellite and each providing a first digital datum, called the code pseudo-distance, representing a pseudo-distance between the receiver and the satellite calculated on the basis of an instantaneous phase measurement of a pseudo-random code present in the signal transmitted by the satellite and a second digital datum, called the carrier pseudo-distance, representing this pseudo-distance calculated on the basis of an instantaneous phase measurement of the carrier of the signal transmitted by the satellite, characterized in that it comprises an extended Kalman filter comprising means for calculating propagation of an estimated position of the receiver in a terrestrial reference frame, so as to establish, on the basis of a previously calculated estimated position, a propagated estimated position;

means for calculating propagation of an estimated state vector comprising in particular the error in the estimated position of the receiver, on the basis of a matrix propagation equation involving a propagation matrix, means for calculating registration of the state vector estimated on the basis of observations relating to each satellite and of a matrix of observations relating the state vector and the observations, means for calculating observations, receiving on the one hand the code and carrier pseudo-distances and on the other hand a calculated estimated pseudo-distance between the receiver and each satellite, so as to establish observations to be applied to the input of the registration calculation means, means for calculating an estimated pseudo-distance calculated for each satellite, by calculating the distance between the propagated estimated position of the receiver in the terrestrial reference frame and each satellite.

The Kalman filter will in general also comprise:

means for calculating propagation of the covariance matrix of the estimated state vector;

means for calculating registration of the covariance matrix of the estimated state vector;

means for calculating the registration gain on the basis of the propagated covariance matrix and of the observation matrix;

means for applying a correction to the propagated estimated position measurement, on the basis of error correction;

means for applying this error correction to the estimated state vector;

means for calculating this error correction on the basis of the values of the stored estimated state vector.

The invention therefore proposes to use, rather than a smoothing of the code by the carrier phase carried out axis by axis, a specific Kalman filtering in which the input data are:

an unsmoothed code pseudo-distance measurement, rather than a phase-smoothed code pseudo-distance measurement;

a carrier pseudo-distance measurement, and not a measurement of phase increments between two successive observations.

By virtue of this, it is noted that it is possible to obtain a protection radius which slowly deteriorates when a satellite is lost but which improves instantaneously when a new satellite is acquired. In the absence of disruption to the geometry of the satellite constellation, the protection radius improves progressively in the course of the successive position measurements.

Advantageously, the state model brings into the state vector, for each satellite, a component representing the ambiguity of the carrier phase. It is in fact this ambiguity which constitutes the main error in the pseudo-distance measurement by the carrier phase and it is desirable to reduce this error.

Moreover, to help the determination of a protection radius in the presence of a satellite failure (that is to say a satellite transmits without it being known a signal which is erroneous but which presents the appearance of a valid signal), the following arrangement is envisaged: the Kalman filter constitutes a main filter providing a position calculated in the terrestrial reference frame on the basis of observations made on m satellites identified by their rank i (i integer from 1 to m), and the receiver moreover comprises m auxiliary Kalman filters of rank i, an auxiliary filter of rank i receiving the signals from all the satellites with the exception of those originating from the satellite of rank i.

The receiver then comprises means for calculating a protection radius on the basis of the outputs of the various Kalman filters and means for verifying that this protection radius does not exceed a determined threshold.

In the case of an onboard receiver operating in differential mode with the aid of differential corrections dispatched by a ground station which comprises M receivers, the onboard receiver preferably comprises, in addition to the Kalman filter mentioned first and called the main filter, M other Kalman filters termed auxiliary filters of rank j, j integer varying from 1 to M, and M greater than 1, and in that each digital processing channel receives corrections from M fixed receivers of rank j placed in the ground station and calculates:

on the one hand an average of the M first corrections and an average of the M second corrections, these averages serving as corrective terms for formulating the first and second digital data for the main filter on the other hand, for each rank j, an average of M−1 first corrections and an average of M−1 second corrections, excluding the corrections arising from the receiver of rank j, these averages serving as corrective terms for formulating the first and second digital data for the filter of rank j.

BRIEF DESCRIPTION OF THE DRAWINGS

Other characteristics and advantages of the invention will emerge from the description hereafter of an embodiment given by way of example. This description will be offered in relation to the appended drawings in which.

DETAILED DESCRIPTION OF THE DRAWINGS

To facilitate the reading of the description, the same references will designate the same elements in the various figures.

Figure 1:
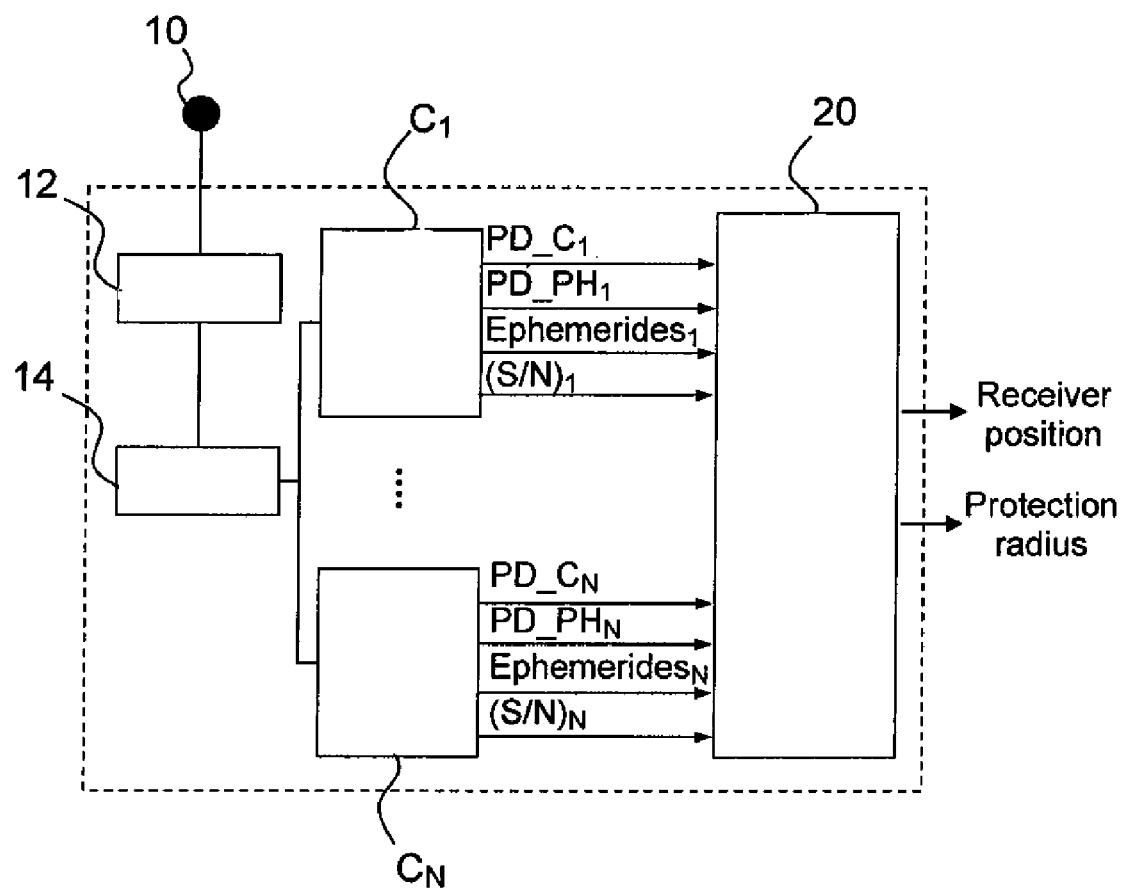
FIG. 1 schematically represents the architecture of a receiver of a GPS system according to the invention.

FIG. 1 schematically represents the architecture of a signal receiver of a satellite-based radionavigation system. A GPS receiver conventionally comprises an antenna 10, an analog circuit 12 performing amplifications and changes of frequency, an analog-digital converter 14, and at least N digital processing channels $C_1$ to $C_N$ if one wishes simultaneously to receive the signals coming from at least m satellites, m being less than N, channel $C_i$ of rank i being assigned to satellite i.

Each digital channel $C_i$ of rank i receives a digitized signal containing the whole set of satellite signals which it submits to a double slaving loop making it possible on the one hand to phase-synchronize a carrier that is generated locally with the carrier arising from satellite i and on the other hand to synchronize a pseudo-random code that is generated locally with an identical code present in the satellite signal and specific to this satellite. The digital processing channels are all identical with the exception of their pseudo-random code generator which is programmed to select a determined satellite.

The two slaving loops each comprise two digitally controlled oscillators whose content represents:

in the case of the first oscillator, the instantaneous phase of the local pseudo-random code (aligned with the code present in the signal), which constitutes the measurement of the instantaneous phase of the code received.

in the case of the second oscillator, the instantaneous phase of the local carrier (aligned with the phase of the carrier present in the signal received from the satellite, to within the phase shift introduced by the circuits of the receiver), which constitutes the measurement of the instantaneous phase of the carrier received.

the measurement of the instantaneous phase of the code in the channel $C_i$ is used to calculate a first digital datum called the code pseudo-distance $PD\_C_i$, representing a first measurement of the pseudo-distance between the receiver and the satellite of rank i; this measurement is unambiguous but fairly noisy.

The measurement of the instantaneous phase of the carrier in the channel $C_i$ is used to calculate a second digital datum, called the carrier pseudo-distance $PD\_PH_i$, representing a second measurement of the pseudo-distance between the receiver and the satellite of rank i; it is not very noisy but ambiguous.

Therefore, in each digital processing channel there are two independent measurements PD_C$_i$ and PD_PH$_i$ of one and the same pseudo-distance separating the receiver from each satellite. The two measurements of pseudo-distances PD_C$_i$ and PD_PH$_i$ (i denoting a satellite number) are obtained in the form of durations of signal propagation between the satellite of rank i and the receiver along the axis (satellite axis) joining the satellite and the receiver.

The digital channels also establish other information, in particular data bits representing information arising from the satellites (ephemerides making it possible to calculate the position of the satellites at any moment).

Finally, the channels formulate, on the basis of the reception conditions, a measurement of the signal/noise ratio (S/N)$_i$ for each satellite. The noise level, which makes it possible to calculate the standard deviation of the measurement error due to thermal noise is measured by the signal processing performed within the digital channel of rank i, like the signal level coming from the satellite of rank i.

These data are supplied to a computer 20 whose function it is to calculate the position of the receiver as well as a protection radius. In practice, the receiver calculates not only the position but also the velocity of the receiver and the time at the measurement instant, the whole generally being called the PVT point.

The computer 20 outputs a PVT point and a protection radius value. This value is calculated on the basis of the precise measurements of the various satellites and a non-integrity probability threshold that must not be exceeded. If one wishes to take account of the risks of non-continuity, the value is also calculated on the basis of other considerations which will be returned to later and which involve a non-continuity probability threshold that must not be exceeded.

According to the invention, the computer 20 uses, for the calculation of the PVT point, an extended Kalman filter whose input data comprise not only the first digital datum (code pseudo-distance obtained on the basis of the unsmoothed measurement of the instantaneous phase of the code) but also the second digital datum (carrier pseudo-distance obtained on the basis of measuring the instantaneous phase of the carrier).

Figure 2:
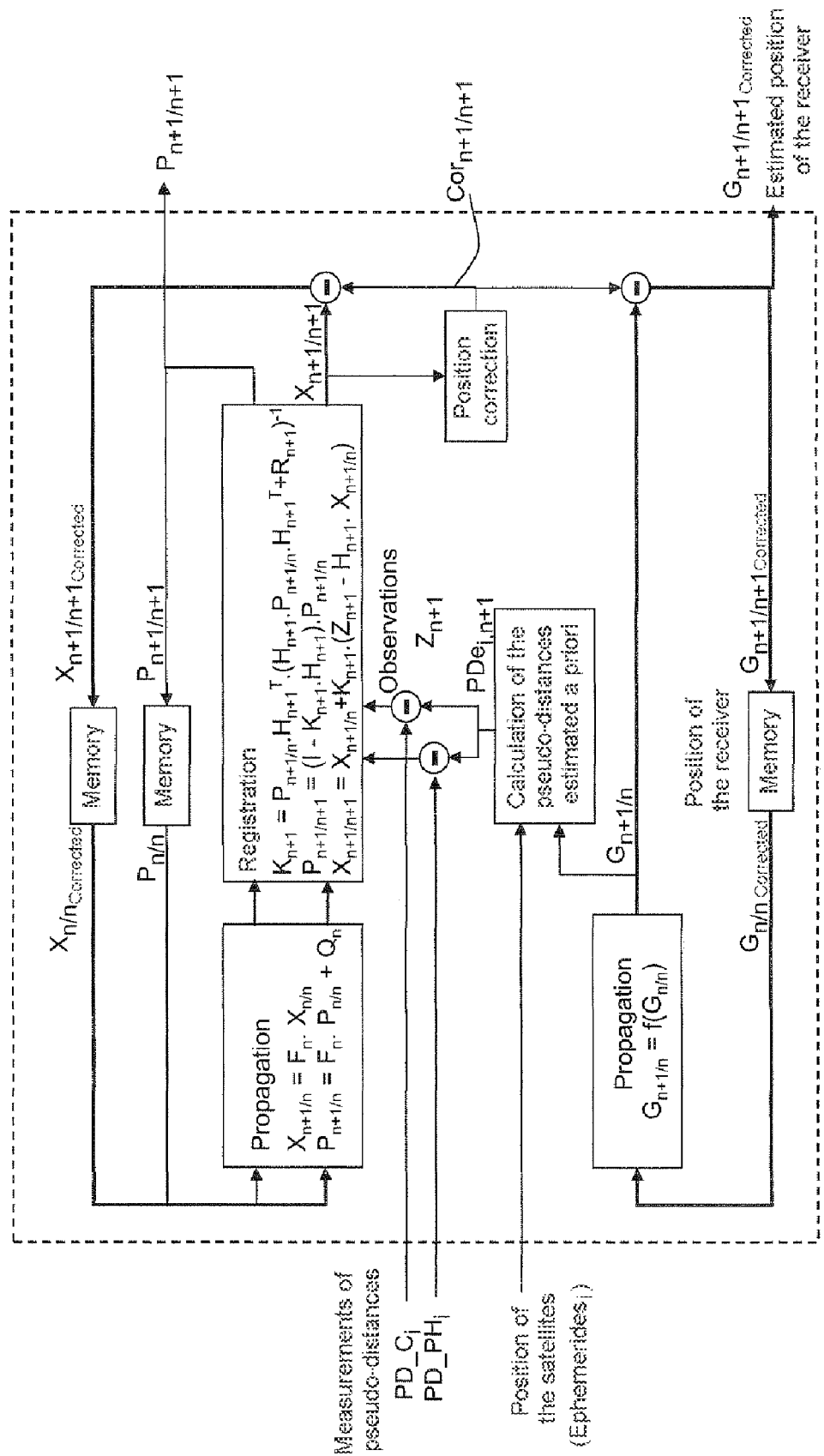
FIG. 2 represents an operating flowchart for the receiver Kalman filter according to the invention processing a monofrequency signal.

FIG. 2 represents an operating flowchart for this extended Kalman filter (which is an algorithmic filtering implemented on digital data). The filter described assumes that there are m satellites observed by the GPS receiver.

The Principle of Kalman Filtering is Recalled:

Kalman filtering uses a state model, established on the basis of the knowledge (proven or assumed) of the behavior of the physical quantities related to the unknowns that one seeks to determine (in this instance the position of the receiver) and to the measurements available (in this instance the code pseudo-distance and carrier pseudo-distance).

This state model consists of:
a state vector $X_n$ representing the physical quantities modeled at the instant $t_n$, comprising a number of components $N_{state}$ which is a priori unconnected with m the number of satellite received.
a propagation model, of the form:

$$X_{n+1} = F_n \cdot X_n + V_n$$

where:
$X_{n+1}$ is the state vector at the instant $t_{n+1}$
$F_n$ is the propagation matrix over [$t_n$, $t_{n+1}$], of dimension $N_{state} \cdot N_{state}$ $V_n$ is the white, Gaussian noise propagation vector over [$t_n$, $t_{n+1}$], of zero mean and covariance matrix $Q_n = E[V_n^T \cdot V_n]$ (where $V_n^T$ is the vector transpose of $V_n$) and of dimension $N_{state}$.
an observation model, of the form:

$$Z_n = H_n \cdot X_n + W_n$$

where:
$Z_n$ is the observation vector at the instant $t_n$, of dimension $N_{obs}$
$H_n$ is the observation matrix at the instant $t_n$, of dimension $N_{obs} \cdot N_{state}$
$W_n$ is the white, Gaussian measurement noise vector at the instant $t_n$, of zero mean and covariance matrix $R_n = E[W_n^T \cdot W_n]$ (where $W_n^T$ is the vector transpose of $W_n$) and of dimension $N_{obs}$.

In this state model, the value of the state vector $X_n$ is a priori unknown. It is not directly accessible by measurement, contrary to the observation vector $Z_n$, but only by way of the observation model.

The Kalman filter estimates the state vector by a propagation calculation, based on the propagation model, and by a registration calculation, based on the observations and the observation model.

For this purpose the filter uses two variables:
the estimated state vector, denoted $X_{n/n}$ after registration at the instant $t_n$, denoted $X_{n+1/n}$ after propagation between the instants $t_n$ and $t_{n+1}$, and denoted $X_{n+1/n+1}$ after registration at the instant $t_{n+1}$, of dimension $N_{state}$.
the covariance matrix of the estimated state, denoted $P_{n/n}$ after registration at the instant $t_n$, denoted $P_{n+1/n}$ after propagation between the instants $t_n$ and $t_{n+1}$, and denoted $P_{n+1/n+1}$ after registration at the instant $t_{n+1}$, of dimension $N_{state} \cdot N_{state}$ To carry out the propagation calculation, the filter uses the formulae:

For the estimated state vector:

$$X_{n+1/n} = F_n \cdot X_{n/n}$$

For the covariance matrix:

$$P_{n+1/n} = F_n \cdot P_{n/n} \cdot F_n^T + Q_n$$

(where $F_n^T$ is the matrix transpose of $F_n$)

To carry out the registration calculation, the filter uses the formulae:

For the registration gain:

$$K_{n+1} = P_{n+1/n} \cdot H_{n+1}^T \cdot (H_{n+1} \cdot P_{n+1/n} \cdot H_{n+1}^T + R_{n+1})^{-1}$$

(where $H_{n+1}^T$ is the matrix transpose of $H_{n+1}$)

For the estimated state vector:

$$X_{n+1/n+1} = X_{n+1/n} + K_{n+1} \cdot (Z_{n+1} - H_{n+1} \cdot X_{n+1/n})$$

For the covariance matrix:

$$P_{n+1/n+1} = (Id_{Nstate} - K_{n+1} \cdot H_{n+1}) \cdot P_{n+1/n}$$

(where $Id_{Nstate}$ is the identity matrix of dimension $N_{state} \cdot N_{state}$)

At the outset, the state vector $X_0$ is initialized to zero and the matrix $P_0$ is initialized with the variances and covariances that are representative of the uncertainty in the physical quantities modeled in the state vector.

The propagation calculation involves the matrices $F_n$ and $Q_n$ to determine the propagated estimated state vector $X_{n+1/n}$ on the basis of the registered estimated state vector $X_{n/n}$ and the propagated covariance matrix $P_{n+1/n}$ on the basis of the registered covariance matrix $P_{n/n}$.

The registration calculation involves the observations $Z_{n+1}$ arising from the measurements of the receiver and the matrices $H_{n+1}$ and $R_{n+1}$, to determine the registered estimated state vector $X_{n+1/n+1}$ on the basis of the propagated estimated state vector $X_{n+1/n}$ and the registered covariance matrix $P_{n+1/n+1}$ on the basis of the propagated covariance matrix $P_{n/n}$.

Thereafter, n is incremented by 1 (i.e. n=n+1), propagation is commenced again followed by registration, and so on and so forth.

Physical Interpretation of the Kalman Filter:

The coefficients of the covariance matrix $P_n$ represent the variance of each of the components of the estimated state vector (diagonal terms) and the covariance of the various pairs of components of this vector (non-diagonal terms). The matrix $P_n$ represents as it were the degree of confidence that is attributed to the estimated state vector. The matrix $P_n$ constitutes an output of the Kalman filter used for the calculation of the protection radii as will be presented further on.

The propagation matrix $F_n$ serves to establish a linear relation between the state vector before propagation and after propagation.

The covariance matrix $Q_n$ of the propagation noise makes it possible to quantify the approximations made in the propagation model for each component of the state vector $X_{n/n}$.

The observation matrix $H_n$ serves to establish a linear relation between the state vector and the measurements in satellite axes; in particular it gives the relation between the error in the estimated position in geographical axes and the deviation induced by this error between the pseudo-distance calculated on the basis of this estimated position and the measured pseudo-distance. The matrix $H_n$ contains the direction cosines of the satellite axes, calculated on the basis of the satellite positions obtained by virtue of the ephemerides.

The covariance matrix $R_n$ of the measurement noise characterizes the inherent noise of the GPS receiver measurements. For this purpose, a signal/noise ratio datum $(S/N)_i$ is preferably provided by the GPS receiver for each satellite. $R_n$ is a square matrix of dimension $N_{obs} \cdot N_{obs}$.

Principle of an Extended Kalman Filter:

Since the relation between the position of the receiver and the pseudo-distance measurements is not linear, an extended Kalman filter is used to linearize this relation. For this purpose, the state model uses a state vector whose first components represent not the position, but the error in the estimated position.

The components of the observation vector $Z_{n+1}$ are constructed by differencing the pseudo-distances measured and the pseudo-distances estimated at the date $t_{n+1}$.

The estimated pseudo-distance $PDe_{i,n+1}$ along each satellite axis is calculated by the Euclidian distance between the position of the satellite in the terrestrial reference frame at the instant $t_{n+1}$ (given by the ephemerides) and the estimated position of the receiver in the same reference frame at the same instant. This estimated position $G_{n+1/n}$ may, in the simplest case, be the previously calculated value $G_{n/n}$ of the PVT point (at the instant $t_n$); however, in a more elaborate variant, it may be estimated on the basis of other information: for example, knowing the velocity vector of the receiver, it is possible to calculate a more precise estimated position $G_{n+1/n} = f(G_{n/n})$ by extrapolating on the basis of this velocity vector and the PVT point previously calculated $G_{n/n}$.

Represented in FIG. 2 is a memory that accepts $X_{n+1/n+1}$ and provides $X_{n/n}$ so as to indicate that the state vector value introduced into the propagation model for the calculation of $X_{n+1/n}$ dated from the instant $t_{n+1}$ is the state vector value $X_{n/n}$ which was calculated at the previous instant $t_n$. Likewise, a memory has been represented for the covariance matrix $P_{n/n}$ and for the estimated position $G_{n/n}$.

Principle of the Kalman Filter According to the Invention:

For each axis of a satellite of rank i, there are in the observation vector two components, namely:

on the one hand the difference between the code pseudo-distance $PD\_C_i$ (measured) and the estimated pseudo-distance $PDe_{i,n+1}$ (calculated);

on the other hand the difference between the carrier pseudo-distance $PD\_PH_i$ (measured) and the same estimated pseudo-distance $PDe_{i,n+1}$ (calculated).

The dimension of the observation vector is therefore 2·m ($=N_{obs}$).

In the receiver according to the invention, the number of components of the state vector ($N_{state}$) is at least equal to 4+m: These components represent the errors in the estimated position of the receiver in the terrestrial reference frame, along the three spatial coordinates, the error in the date of the measurement (time bias due to the clock of the receiver) and for each satellite an ambiguity in the measurement of the carrier phase.

On output from the registration model, $X_{n+1/n+1}$ the state vector estimated at the instant $t_{n+1}$ has been successfully evaluated. This estimated value of the state vector is used to calculate a new iteration through the Kalman filter. It also serves to formulate a correction $Cor_{n+1/n+1}$ in the estimated position, so as to reduce, at each iteration or with a longer period, the state vector position error values to zero. If the position error components are dL, dG, dh, the correction consists in subtracting these values from the state vector. This correction is applied simultaneously to $X_{n+1/n+1}$ and $G_{n+1/n}$ to give $X_{n+1/n+1\ corrected}$ and $G_{n+1/n+1\ corrected}$. The position correction $Cor_{n+1/n+1}$ is applied both to the estimated position and to the estimated state vector so as to retain consistency between the estimate of the error in the estimated position and the estimated position. In fact, the new iteration of the Kalman filter uses $X_{n+1/n+1\ corrected}$ and not $X_{n+1/n+1}$; likewise it is the value of $G_{n/n\ corrected}$ which is used to obtain $G_{n+1/n}$.

The configuration described hitherto relates to a receiver that carries out a direct (or absolute) measurement of a mono-frequency GPS signal. In this case, the sources of errors in the calculation of the position of the receiver are in particular related to the nature of the atmospheric layers crossed which induces a delay in the propagation of the signal along the satellite axis, that is different for each satellite, to the origin of an error in the measurement of the duration of propagation and consequently in the measurement of the positioning, or else to the multi-path errors caused by reflections of the signal on objects in proximity to the receiver.

There are at least three other receiver configurations for a GPS system according to the invention which make it possible to more or less completely circumvent these errors: a second configuration (dual-frequency) manages to limit effects related to the propagation of the signal in the ionosphere, two other configurations (differential and relative) make it possible in addition to reduce further the tropospheric and system errors and the errors due to thermal noise and to multipaths.

The propagation of the signal in the ionosphere produces effects on the code and carrier phase measurements, which effects depend on the frequency of the carrier. This error is inversely proportional to the square of the frequency, it is of positive sign on the code measurements (group delay) and of opposite sign on the carrier phase measurements (phase advance).

A double measurement carried out on two carriers of different frequencies makes it possible to circumvent the effects of the ionosphere by combining the two simultaneous measurements of the code and phase of the carriers. The configuration of the GPS receiver according to the invention aimed at reducing the influence of the atmosphere crossed implements a dual-frequency measurement.

If one considers a constellation of m satellites simultaneously transmitting two signals of respective frequencies $L_1$ and $L_2$. A GPS receiver according to the invention comprises channels $C_i$, which each comprise two subchannels $SCL1_i$ and $SCL2_i$ each receiving a signal at different carrier frequency, originating from the same satellite. Each subchannel produces a measurement of pseudo-distance by the code and a measurement of pseudo-distance by the carrier.

Figure 3:
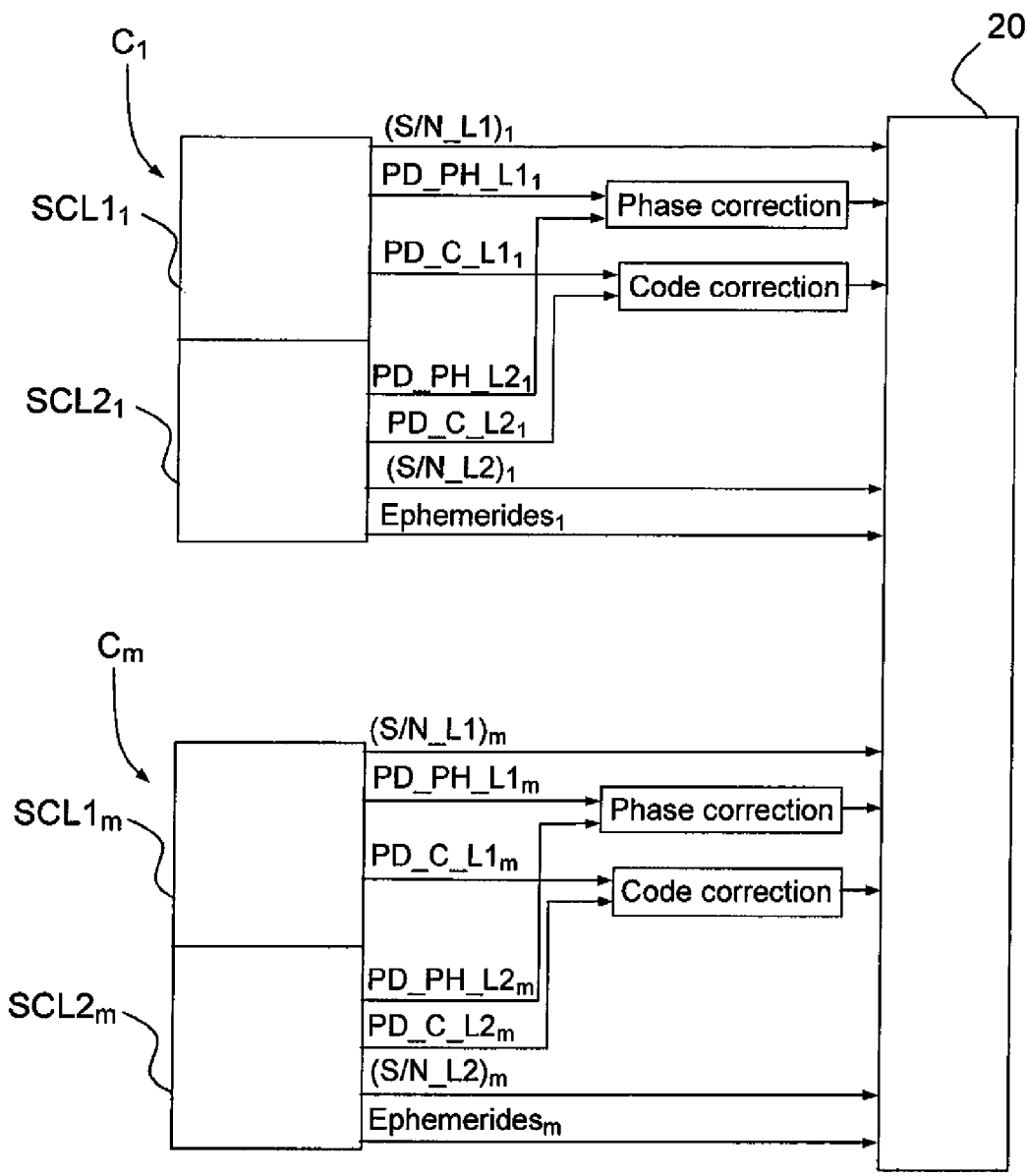
FIG. 3 represents an operating flowchart for the receiver Kalman filter according to the invention processing a dual-frequency signal.

The interfaces of a channel of the receiver (channel $C_i$) operating in this configuration are presented in FIG. 3, they are slightly different from those presented in FIG. 1. On the other hand, the flowchart of the Kalman filter integrated with the computer remains unchanged with respect to that presented in FIG. 2.

The ionospheric corrections applied to the carrier phase measurements are amply described in the literature, they consist in making a linear combination of the code measurements made at the two frequencies and a linear combination of the carrier phase measurements made at the two frequencies. These combinations culminate in a measurement of pseudo-distance by the carrier and a measurement of pseudo-distance by the code; it is these two measurements which are applied to the Kalman filter of FIG. 2 to establish the observations $Z_{n+1}$.

It is also possible, rather than combining the measurements upstream of the Kalman filter, to combine them in the filter itself: in this case, the measurements carried out on the two frequencies to establish twice as many observations are input directly into the filter. These measurements are two measurements of pseudo-distances carried out by virtue of the code and two measurements of pseudo-distances carried out by virtue of the carrier phase, on each satellite. In this way it is possible not to lose the continuity of the measurement if one of the frequencies disappears.

It is also possible to model another error i.e. the error due to propagation in the troposphere. This error is common to the four measurements of pseudo-distances, of code and of carrier, on L1 and on L2, it is decorrelated between the satellites and exhibits a very slow dynamic swing. It can also be likened to the errors due to the inaccuracy in the positions and clocks of the satellites, which exhibit the same characteristics, and which manifest themselves on the calculated estimated pseudo-distance, hence which are found in the observation Z. These errors become predominant when the ionospheric error is eliminated by virtue of a dual-frequency method.

Figure 4:
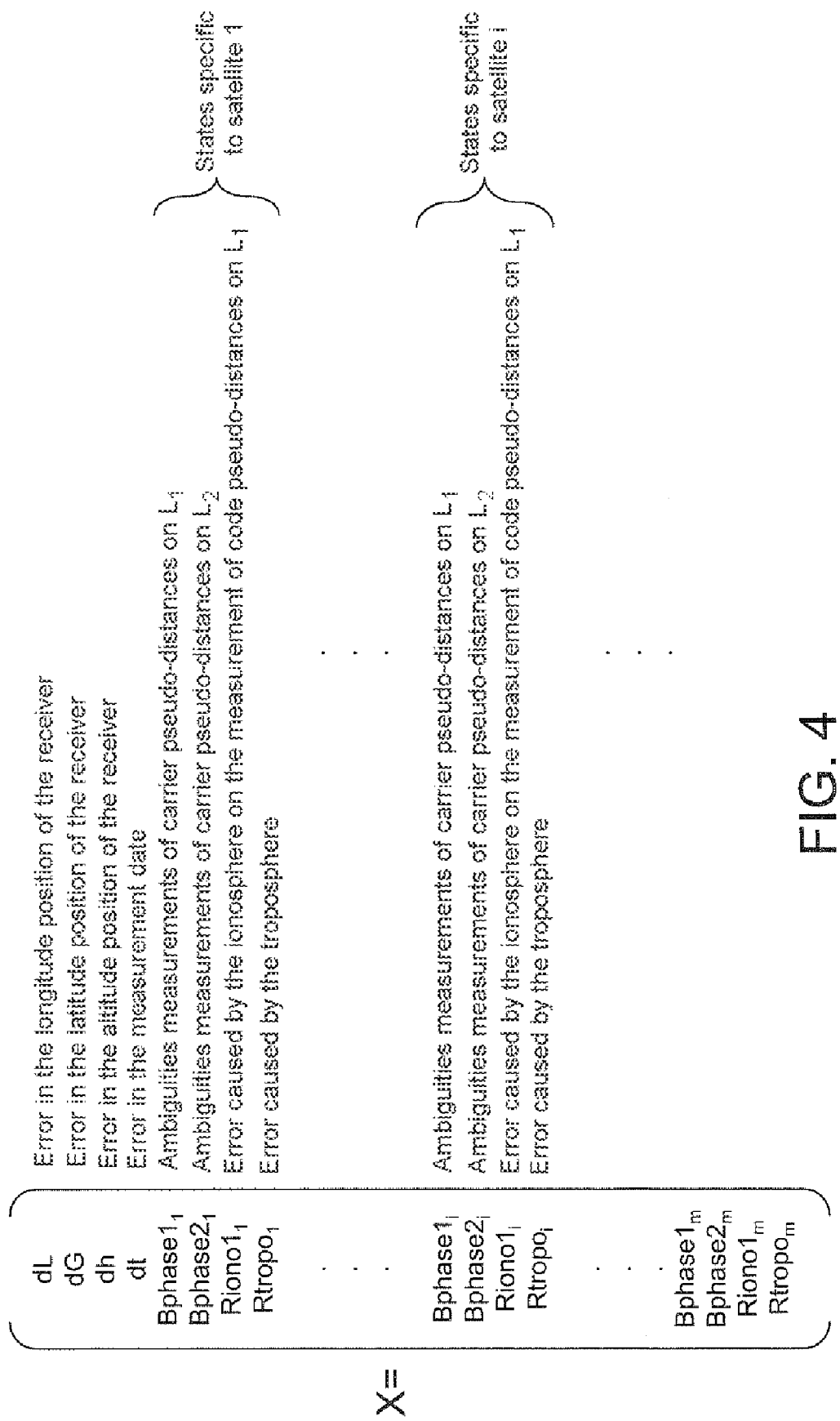
FIG. 4 represents the structure of the state vector X in the case of an evaluation of the errors related to the atmosphere and of a measurement carried out on a dual-frequency signal.

FIG. 4 represents a state vector in the case of a Kalman filter according to the invention, integrating dual-frequency measurements, with in the state model, the modeling of the ionospheric error and tropospheric error. In this case, the first four components of the state vector are the errors in the receiver position, expressed for example according to the longitude (dL), the latitude (dG) and in the altitude (dh) and in the date of the measurement (dt). There is thus a group of four components for each satellite. The first two are dubbed $Bphase1_i$ and $Bphase2_i$ and represent the ambiguities in the measurements of carrier pseudo-distances on the frequencies $L_1$ and $L_2$ respectively. The third component ($Riono1_i$) models the error caused by the ionosphere in the measurement of code pseudo-distances $L_1$. The fourth component ($Rtropo_i$) models the error caused by the troposphere, the errors in the other pseudo-distances being deduced by change of sign (carrier $L_1$) or as inverse ratio of the square of the frequencies (code and carrier $L_2$). The modeling of the tropospheric and ionospheric errors may be of a higher order so as to take better account of the temporal dynamics of its effect, on condition that at least one additional state is added for each satellite received. The modeling of the ionospheric error and of the tropospheric error may naturally be carried out in the first configuration (mono-frequency) and in this case, the state vector described in FIG. 4 comprises m components at least (those which relate to the ambiguities of the second measurements of carrier pseudo-distances).

The receiver according to the invention may be implemented according to a third advantageous configuration which simultaneously reduces the errors related to the system and to the atmosphere as well as the multipath and thermal noise errors. The principle thereof relies on a differential correction of the pseudo-distance measurements.

Figure 5:
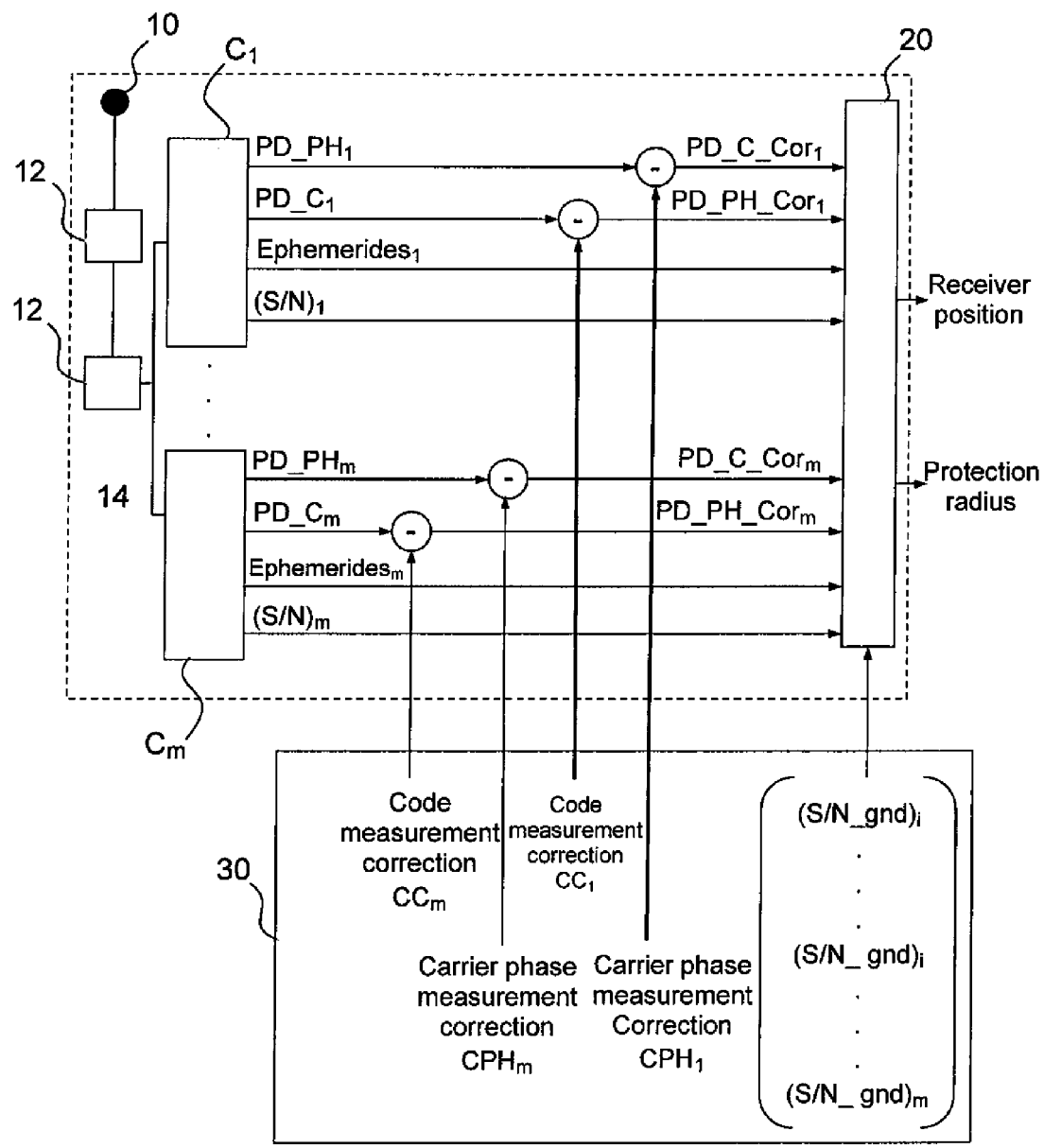
FIG. 5 schematically represents the architecture of a receiver of a GPS system according to the invention under differential operation.

FIG. 5 represents the architecture of a receiver of a GPS system under differential operation. In addition to the references of FIG. 1, there is a receiver 30 placed on the ground, in proximity to the onboard receiver. The position of the ground receiver 30 is known precisely. If the receiver of the ground station receives a signal from a satellite, for example the satellite of rank i, the position of the satellite is transmitted to it by means of the ephemerides. Thus, the ground receiver can calculate the theoretical distance which separates it from the satellite and compare this value with the two pseudo-distance measurements that it performs on the basis of the signal delivered by the satellite (by code measurement and by phase measurement of the carrier respectively). The difference between the theoretical distance and the pseudo-distance measured by the code is dubbed $CC_i$. The difference between the theoretical distance and the pseudo-distance measured by the carrier phase is dubbed $CPH_i$. These two terms are specific to satellite i and to its position at the instant $t_n$, they carry the mark of the errors related to the transmission of the signal, to its propagation along the satellite axis up to its reception by the ground receiver. These same errors are present in the measurements carried out by the onboard receiver. The communication by the ground receiver of $CC_i$ and $CPH_i$ to the onboard receiver therefore enables the latter to effect by subtraction a correction of the measurements $PD\_C_i$ and $PD\_PH_i$ of the pseudo-distance which separates it from satellite i. $PD\_C\_Cor_i$ and $PD\_PH\_Cor_i$ are the results of this pseudo-distance measurement correction.

If m satellites are visible, the onboard receiver and the ground receiver each carry out 2·m measurements of pseudo-distances and the ground receiver transmits a correction for each measurement to the onboard receiver. Finally, 2·m measurements of pseudo-distances, corrected by as many corrective terms calculated on the ground, are supplied to the computer 20.

The errors related to the "system" and to atmospheric transmission are greatly reduced by this configuration, all the more so the closer is the position of the onboard receiver to that of the ground receiver. In particular, it is in this case no longer necessary to evaluate the errors related to propagation in the atmosphere, only the ambiguity in the measurement of the phase of the carrier of each satellite remains to be evaluated.

The number and the nature of the components of the state vector $N_{state}$ to be processed in the Kalman filter are equivalent to those required for an absolute measurement (for which $N_{state}$ is greater than 4+m) on a mono-frequency signal. The minimum number of components of the observation vector equals 2·m. This configuration may be achieved on condition that the onboard receiver has means for receiving the corrections from the ground station and for subtracting them from the corresponding pseudo-distance measurements. In differential GPS systems the corrections are conventionally transmitted to the receiver by RF.

The receiver according to the invention can be implemented according to a fourth configuration, in a relative mode of navigation, that is advantageous in that it enables the mobile receiver to position itself not in absolute terms but with respect to another reference mobile receiver, while eliminating the system and atmospheric errors that are common to both receivers. In this case the observations of the Kalman filter are obtained by subtracting from the code and carrier pseudo-distances of each satellite the respectively code and carrier pseudo-distances measured by the reference mobile receiver and transmitted by dedicated RF channel (instead of the pseudo-distances estimated by calculation). Such is the case for example when landing a plane on an aircraft carrier where the position calculations performed by the receiver are expressed in a reference frame centered on the aircraft carrier.

The receiver according to the invention can be implemented with a Kalman filter that integrates the error model of an inertial aid. In this case the state vector integrates into its components the inertial errors in velocity, attitudes, bias of the accelerometers and drifting of the gyrometers. The propagation matrix F integrates the linearized model of the evolution of the inertial errors. The estimated position is the inertial position, propagated by virtue of the increments in velocity and in inertial angles measured by the inertial sensors (accelerometer and gyrometer respectively) by an integration calculation using for example, the quaternion algorithm.

Calculation of the Protection Radii

As already stated, a protection radius is a very important measure in certain applications where it is vital to ensure the integrity of the data. It is recalled that the protection radius RP of a measurement, for a predetermined non-integrity probability $P_{ni}$ is an upper bound on the deviation between the calculated value and the real value of the measured quantity, such that there is a probability of less than $P_{ni}$ that the real value is a greater distance than RP away from the calculated value. Stated otherwise, there is therefore a maximum probability $P_{ni}$ that the real value is outside a circle of radius RP about the value that was measured or else that there is a maximum probability $P_{ni}$ of being mistaken in the determination of the protection radius.

This protection radius is calculated on the basis of the standard deviations of the variables considered. It is applied to each component of the state, but in practice it is the position variables that are of interest. It is possible to calculate more specifically a vertical protection radius for the altitude and a horizontal protection radius for the position in longitude and latitude, these radii not necessarily having the same value and not being used in the same manner (the vertical protection radius is a more critical datum).

The protection radius is in general a datum which is calculated and then compared with a fixed threshold depending on the application, the overstepping of the threshold generating an alert indicating either that the position measurement cannot be considered to be sufficiently reliable in the context of the application (hypothesis $H_0$ defined hereinbelow), or the supposed presence of a fault (according to hypothesis $H_1$ defined hereinbelow). The nature of the application fixes the maximum probability $P_{ni}$.

The protection radius $RP_{H0}$ in the absence of any satellite fault, hypothesis commonly designated $H_0$, is evaluated. "Fault" is intended to mean an abnormal situation where the satellite transmits signals which have the appearance of normal signals but which are abnormal and lead to position errors.

The protection radius $RP_{H0}$ is related directly to the variance of the quantity measured and to the probability $P_{ni}$ that this error exceeds the protection radius by the following approximate table, presupposing a Gaussian probability law for the measurement errors:

| Value of $P_{ni}$ | Value of $k_{PNI}$ | Value of $RP_{H0}$ |
|---|---|---|
| $10^{-1}$ | 1.64 | $1.64 \times \sigma$ |
| $10^{-2}$ | 2.58 | $2.58 \times \sigma$ |
| $10^{-3}$ | 3.28 | $3.28 \times \sigma$ |
| $10^{-4}$ | 3.89 | $3.89 \times \sigma$ |
| $10^{-7}$ | 5.33 | $5.33 \times \sigma$ |
| $10^{-9}$ | 6.11 | $6.11 \times \sigma$ |

The variance is the square of the standard deviation $\sigma$ related to the measured quantity. The variance in the measured position is therefore the coefficient of the diagonal of the covariance matrix P which corresponds to the measured quantity. If the altitude is the measured quantity and is situated in the third rank in the state vector and in the variance matrix P, the variance of the altitude is the third coefficient in the diagonal of this matrix. The standard deviation $\sigma$ is the square root of this variance, it is therefore deduced from the matrix P in a Kalman filter.

According to the non-integrity probability $P_{ni}$ fixed (and hence according to the application envisaged) it is therefore possible to determine a coefficient $k_{PNI}$ such that the protection radius $RP_{H0}$ will be equal to $k_{PNI} \cdot \sigma$. The coefficient $k_{PNI}$ takes a value lying between 1 and 7 in accordance with the values of the table above.

In the case of a receiver that sees m satellites, $RP_{H0}$ is calculated on the basis of the following rule:

$$RP_{H0} = SUP_{i=1 \; to \; m}[k_{PNI} \cdot \sigma_i]$$

Where $\sigma_i$ are standard deviations of the variables considered.

In the GPS receiver according to the invention, it is therefore possible to calculate the protection radius $RP_{H0}$ on the basis of the coefficients of the covariance matrix P such as they appear at the measurement instant. If the configuration of the satellites evolves, the value of the protection radius is updated at the same time. If a satellite disappears from the visible constellation, the protection radius degrades only progressively. If conversely, a new satellite appears, the protection radius decreases instantaneously, this being very advantageous.

It is also possible to calculate a protection radius $RP_{H1}$ that takes account of the risk of a satellite fault, hypothesis commonly designated $H_1$. For this purpose, the receiver uses the procedure well known by the name "separation maximum". In this case, the receiver comprises not just one Kalman filter but a main filter which operates as described previously and m auxiliary filters, if m is the number of satellites that can be seen at the same time. The m auxiliary filters operate in parallel with the main filter and according to the same principle as the latter. However, the auxiliary filter of rank i receives the signals from all the satellites except that originating from the satellite of rank i.

Figure 6:
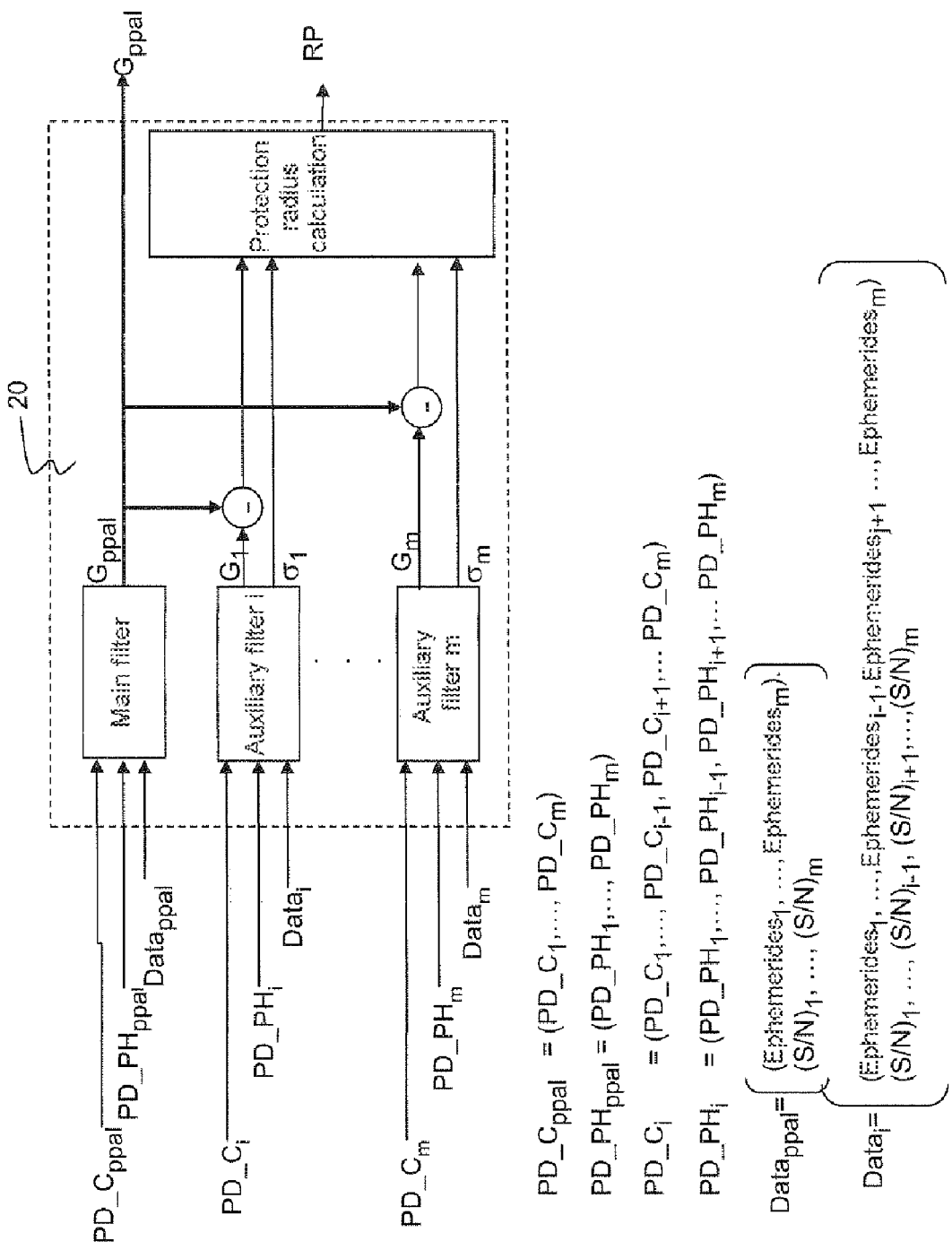
FIG. 6 represents a diagram for obtaining the protection radii calculated in the GPS receiver according to the invention under absolute operation, when m satellites are visible.

FIG. 6 represents a diagram of a scheme for obtaining the various protection radii calculated for a receiver according to the invention carrying out an absolute measurement of the position according to the first two configurations described earlier (absolute GPS, mono-frequency and dual-frequency). The calculation of the protection radius in the third and fourth configurations (differential GPS, fixed or mobile reference) will be returned to later.

It is recalled that the main filter uses the m satellites, and that the m other filters exclude a satellite of rank i each time. These m auxiliary filters each lead to a position and to associated standard deviations for each variable (for example altitude and horizontal distances). In the case where no satellite is defective, the m+1 filters provide positions that are very close to one another. However, if a satellite is defective, the positions provided by the m+1 filters diverge: m filters (including the main filter) are disturbed by the biased measurement, and just a single filter, the one which does not use the measurements from the faulty satellite, which is not known a priori, remains intact. The computer estimates the distances between the position determined by the main filter and each of the positions determined by the auxiliary filters. The largest of these distances demarcates the error in the position of the main filter since it is an upper bound on the distance between the position determined by the main filter and that of the intact filter, to within the errors of this filter. For example, if the protection radius for the altitude is of interest, the computer can determine the maximum of the distances between the altitude provided by the main filter and the altitude provided by each of the m auxiliary filters, plus a quantity that is deemed to bound the error in the altitude of the intact filter and is calculated for example on the basis of the covariance matrices P of the auxiliary filters.

The factor $k_{PND}$ depends on the non-detection probability $P_{nd}$ according to the correspondence given in the following table:

| Value of $P_{nd}$ | Value of $k_{PND}$ |
|---|---|
| $10^{-1}$ | 1.64 |
| $10^{-2}$ | 2.58 |
| $10^{-3}$ | 3.28 |
| $10^{-4}$ | 3.89 |
| $10^{-7}$ | 5.33 |
| $10^{-9}$ | 6.11 |

In the event of a satellite fault, one of the auxiliary filters gives an exact solution in a radius of $k_{PND} \cdot \sigma_i$, $\sigma_i$ being the standard deviation calculated by this auxiliary filter and associated with the solution found by this filter. All the other filters, including the main filter, give a false solution, but it is not known which auxiliary filter gives the exact solution. Hence, the distance $d_i$ between the altitude given by the main filter and that which is given by an auxiliary filter, is calculated, $k_{PND} \cdot \sigma_i$ is added to this distance, $\sigma_i$ being the standard deviation corresponding to this filter. This calculation is carried out for the m auxiliary filters. The maximum value out of the m values thus calculated is taken, and this value constitutes the protection radius $RP_{H1}$ in the event of a satellite fault.

$$RP_{H1} = SUP_{i=1 \text{ to } m}[d_i + k_{PND} \cdot \sigma_i]$$

The calculation is similar for a horizontal protection radius, the standard deviation considered then being the square root of the sum of the variances in longitude and in latitude.

If, for example, an overall non-integrity probability of $10^{-7}$ with a fault probability of $10^{-4}$ is desired, then the probability $P_{nd}$ of non detection is $10^{-3}$ and $k_{PND}=3$. The protection radius $RP_{H1}$ which will be calculated in this case results from the addition of two terms: a first term related to the non detection probability of $10^{-3}$ ($k_{PND} \cdot \sigma$) and a second term related to the distances between the positions determined by the m auxiliary Kalman filters and the position determined by the main Kalman filter.

Ultimately, to take account of both hypotheses, with and without satellite fault, the protection radius $RP_{HUL}$ equals:

$$RP_{HUL} = SUP[RP_{H0}, RP_{H1}]$$

The protection radius $RP_{HUL}$ thus calculated fluctuates with the position errors for the various filters, that are found in the quantities $d_i$. This protection radius may sometimes take abnormally large values if the noise is picked unfavorably. These values may exceed an alarm threshold denoted HAL, depending on the mission, that induces non-continuity.

In the case where one also wishes to ensure continuity of the service, a threshold value is sought such that the probability that the protection radius thus calculated exceeds this threshold is less than the non-continuity probability that is given. This threshold, called the "foreseeable protection radius" or $RP_{HIL}$ is calculated in the following manner:

$$RP_{HIL} = SUP[SUP_{i=1 \text{ to } m}[k_{PFA} \cdot \sigma_{\text{diff } i} + k_{PND} \cdot \sigma_i],$$
$$SUP_{i=1 \text{ to } m}[k_{PNI} \cdot \sigma_i]]$$

Where $\sigma_{\text{diff } i}$ is equal to the square root of the diagonal term of the matrix $P_{\text{diff}}$ characterizing the covariance of the vector $(X_{n/n\ i} - X_{n/n})$, the difference between the state vector of the main filter $(P_{n/n})$ and the state vector $(P_{n/n\ i})$ of the auxiliary filter i, on the basis of which $d_i$ is calculated.

This matrix is equal to: $P_{\text{diff}} = P_{n/n\ i} - P_{n/n}$

The factor $k_{PFA}$ depends on the false alarm probability $P_{FA}$ according to the correspondence given in the following table:

| Value of $P_{FA}$ | Value of $k_{PFA}$ |
|---|---|
| $10^{-1}$ | 1.64 |
| $10^{-2}$ | 2.58 |
| $10^{-3}$ | 3.28 |
| $10^{-4}$ | 3.89 |
| $10^{-7}$ | 5.33 |
| $10^{-9}$ | 6.11 |

The non-continuity probability that one seeks to obtain is equal to the false alarm probability plus the fault probability.

Figure 7:
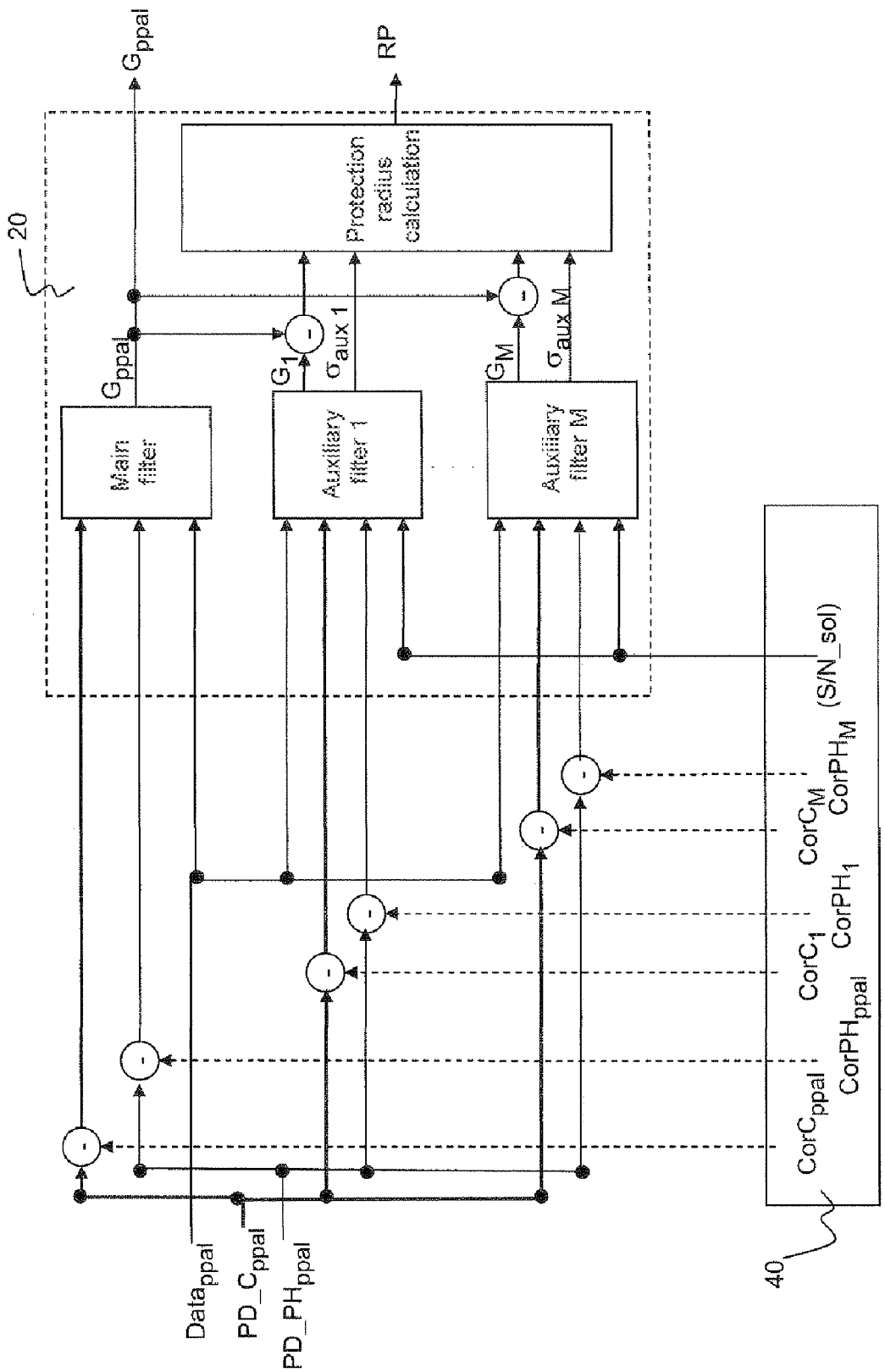
FIG. 7 represents a diagram for obtaining the protection radii calculated in the GPS receiver according to the invention under differential operation when the differential correction is calculated by M ground receivers.

The evaluation of the protection radius differs substantially if the receiver according to the invention operates in accordance with the third or fourth configuration, that is to say when the position is determined on the basis of pseudo-distances measured on a mono-frequency signal and rectified beforehand by means of a differential correction. In fact, in this case, the most penalizing non-integrity is caused by a fault with a reference receiver rather than by a failure of a satellite of the constellation. FIG. 7 represents a diagram of a scheme for obtaining various protection radii calculated by the GPS receiver for a receiver according to the invention which operates in accordance with the third or the fourth configuration.

A situation is considered in which an onboard receiver simultaneously sees m satellites and M ground receivers. The M ground receivers are relatively close together and belong to one and the same ground station 40, their position is known precisely. The procedure for evaluating the protection radius implements a main filtering and M auxiliary filterings.

The main filter operates as explained in FIG. 6 but it receives the corrections from the M ground receivers; it uses as correction of each measurement of pseudo-distance by the code the arithmetic mean of the code corrections of the M receivers; it uses as correction of each measurement of pseudo-distance by the carrier phase the arithmetic mean of the phase corrections of the M receivers.

The channels of the receiver send the main filter m first measurements of the pseudo-distances which separate the receiver from each satellite. These m first measurements are carried out by virtue of the code and are dubbed $PD\_C_{ppal}$. m second measurements of the same pseudo-distances, dubbed $PD\_PH_{ppal}$, are carried out this time by means of the phase of the carrier.

Moreover, each ground receiver calculates m corrective terms for the pseudo-distance measurements carried out by means of the code and m other corrective terms corresponding to the pseudo-distance measurements carried out by virtue of the phase of the carrier in accordance with the procedure described in FIG. 6. Two vectors each with m components are built on the basis of these data $CorC_{ppal}$ and $CorPH_{ppal}$. The $i^{th}$ component of $CorC_{ppal}$ contains the arithmetic mean of the M corrective terms of the measurement of pseudo-distance separating the satellite of rank i from each ground receiver, which measurements are carried out by the code. In parallel, the $i^{th}$ component of $CorPH_{ppal}$ contains the arithmetic mean of the M corrective terms of the measurement of pseudo-distance separating the satellite of rank i from each ground receiver, these measurements being carried out by virtue of the phase of the carrier. The main filter is thus supplied with 2·m pseudo-distance measurements from which are deducted corrective terms calculated on the basis of the differential corrections sent by the receivers of the ground station.

Simultaneously the main filter receives the ephemerides of the m satellites, the signal-to-noise ratios of the m receptions of signals on the onboard receiver, these data are grouped together into a matrix $Data_{ppal}$. On the basis of these data, the main filter determines a receiver position $G_{ppal}$.

Each auxiliary filter operates like the main filter but receives only corrections originating from M−1 ground receivers, the filter of rank j does not receive the corrections from the ground receiver of rank j. The pseudo-distance measurements supplied to the main filter are also supplied to the auxiliary filter of rank j. Before being input into the auxiliary Kalman filter of rank j, these measurements are corrected by the components of $CorC_j$ (respectively $CorPH_j$) which are the arithmetic means of the corrections of M−1 ground receivers, more precisely the corrections of all the code measurements originating from all the ground receivers except for the measurement originating from the ground receiver of rank j, for each satellite (respectively the M−1 carrier phase measurement corrections).

The auxiliary filter of rank j also receives $Data_{ppal}$ and the signal-to-noise ratios corresponding to the receptions of the signals of the m satellites on the M−1 ground receivers, i.e. (M−1)·m signal-to-noise ratio which are sent by the ground station at the same time as the differential corrections. In FIG. 7, the variable (S/N_gnd) groups together the M·m signal-to-noise ratio of the m signals of the satellites on the M ground receivers. On the basis of these data, the auxiliary filter of rank j determines a receiver position $G_j$ and standard deviations which are coefficients of the matrices of the covariances $P_j$.

In a similar manner to the procedure for evaluating the protection radius under the hypothesis $H_0$ of no satellite fault, it is possible to calculate a protection radius under the hypothesis $H_0$ of no ground receiver fault:

$$RP_{H0}=SUP_{j=1 \, to \, M}[k_{PNI} \cdot \sigma_{ppal \, j}]$$

In a similar manner to the procedure for evaluating the protection radius under the hypothesis $H_1$ of a satellite fault, it is possible to calculate a protection radius under the hypothesis $H_1$ of a ground receiver fault:

$$RP_{H1}=SUP_{j=1 \, to \, M}[(d_j+k_{PND} \cdot \sigma_{aux \, j})]$$

Where:

$d_j$ is the distance between the position error, for example altitude error (component of the state vector X) given by the main filter and that which is given by the auxiliary filter of rank j.

$\sigma_{aux \, i,j}$ is the square root of the variance of the position measurement, for example altitude measurement, of the auxiliary filter of rank j, associated with the solution found by this filter.

Ultimately to take account of both hypotheses with and without satellite fault, the protection radius $RP_{HUL}$ equals:

$$RP_{HUL}=SUP[RP_{H0}, RP_{H1}]$$

It is possible to carry out the calculations implemented to determine the protection radius in the differential configuration more simply than by the procedure presented above. This is possible because of the commonality of the calculations carried out by the m+1 Kalman filters required, all of which obey identical equations and have the same gain K.

Let us consider $Z_{ppal}$ the vector of main observations, its m components being equal to the arithmetic mean of the M observations by the M reference receivers. Let us recall that the observations are the deviations between the pseudo-distances measured and the pseudo-distances calculated on the basis of the estimated position of the receiver and of the known positions of the satellites.

Consider additionally, $Z_{mean,j}$ the vector of mean observations of order j, its m components are composed of the arithmetic mean of the M−1 observations by the reference receivers, the missing observation corresponds to that of the reference receiver of rank j.

Consider finally $\Delta Z_j$ which is a vector composed of the difference between the vector of main observations and the vector of mean observations $Z_{mean,j}$ When a Kalman filter, which is the main Kalman filter, is supplied with observations composed of $\Delta Z_j$, a vector denoted dX is obtained as resulting estimated position vector. The components of dX make it possible to get back simply to the distances $d_i$ between the positions established by the auxiliary filters and that determined by the main filter. In this way, the protection radius is calculated by calculating a single Kalman filter (covariance matrix P) and thus the time required to calculate the m other filters is saved.

The details of the vectors, matrices used in the various configurations envisaged in the foregoing description are recalled as a reminder in the annexe hereinafter.

Annexe: Matrices and Vectors Used m: number of satellites received ($\leq N_c$: number of channels. The channels of the receiver are not always all occupied)

A—Mono-frequency Absolute Mode

Propagation Model:

Position and time:

$$X_{pvt} = \begin{bmatrix} dx \\ dy \\ dz \\ dt \end{bmatrix}_4$$

-continued $$F_{pvt} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}_{4,4}$$

$$Q_{pvt} = \begin{bmatrix} \infty & 0 & 0 & 0 \\ 0 & \infty & 0 & 0 \\ 0 & 0 & \infty & 0 \\ 0 & 0 & 0 & \infty \end{bmatrix}_{4,4}$$

Ambiguity of the carrier phases:

$$X_{amb} = \begin{bmatrix} b_{phase\,1} \\ \vdots \\ b_{phase\,m} \end{bmatrix}_m$$

$$F_{amb} = \begin{bmatrix} I_m \end{bmatrix}_{m,m}$$

$$Q_{amb} = \begin{bmatrix} 0_m \end{bmatrix}_{m,m}$$

Ionospheric errors (expressed as distance, in band 1):

$$X_{iono} = \begin{bmatrix} e_{iono\,1} \\ \vdots \\ e_{iono\,m} \end{bmatrix}_m$$

$$F_{iono} = \begin{bmatrix} e^{-\tau_{iono}/\Delta T} & 0 & 0 \\ 0 & - & 0 \\ 0 & 0 & e^{-\tau_{iono}/\Delta T} \end{bmatrix}_{m,m}$$

$$Q_{iono} = \begin{bmatrix} q_{iono\,1} & 0 & 0 \\ 0 & \vdots & 0 \\ 0 & 0 & q_{iono\,m} \end{bmatrix}_{m,m}$$

Tropospheric errors (expressed as distance):

$$X_{tropo} = \begin{bmatrix} e_{tropo\,1} \\ \vdots \\ e_{tropo\,m} \end{bmatrix}_m$$

$$F_{tropo} = \begin{bmatrix} e^{-\tau_{tropo}/\Delta T} & 0 & 0 \\ 0 & - & 0 \\ 0 & 0 & e^{-\tau_{tropo}/\Delta T} \end{bmatrix}_{m,m}$$

$$Q_{tropo} = \begin{bmatrix} q_{tropo\,1} & 0 & 0 \\ 0 & \vdots & 0 \\ 0 & 0 & q_{tropo\,m} \end{bmatrix}_{m,m}$$

Overall:

$$X = \begin{bmatrix} X_{pvt} \\ X_{ambg} \\ X_{iono} \\ X_{tropo} \end{bmatrix}_{4+3m}$$

$$F = \begin{bmatrix} F_{pvt} & 0 & 0 & 0 \\ 0 & F_{ambg} & 0 & 0 \\ 0 & 0 & F_{iono} & 0 \\ 0 & 0 & 0 & F_{tropo} \end{bmatrix}_{4+3m,4+3m}$$

$$Q = \begin{bmatrix} Q_{pvt} & 0 & 0 & 0 \\ 0 & Q_{ambg} & 0 & 0 \\ 0 & 0 & Q_{iono} & 0 \\ 0 & 0 & 0 & Q_{tropo} \end{bmatrix}_{4+3m,4+3m}$$

Observation Model:

Code observation:

$$Z_{code} = \begin{bmatrix} (PD\_C_1 - PD\,e_1) \\ \vdots \\ (PD\_C_m - PD\,e_m) \end{bmatrix}_m$$

$$R_{code} = \begin{bmatrix} \sigma^2_{code\,1} & 0 & 0 \\ 0 & - & 0 \\ 0 & 0 & \sigma^2_{code\,2} \end{bmatrix}_{m,m}$$

$$H_{code} = \begin{bmatrix} H_{pvt} & 0_m & I_m & I_m \end{bmatrix}_{m,4+3m}$$

Carrier observation:

$$Z_{carrier} = \begin{bmatrix} (PD\_PH_1 - PD\,e_1) \\ \vdots \\ (PD\_PH_m - PD\,e_m) \end{bmatrix}_m$$

$$R_{carrier} = \begin{bmatrix} \sigma^2_{carrier\,1} & 0 & 0 \\ 0 & - & 0 \\ 0 & 0 & \sigma^2_{carrier\,m} \end{bmatrix}_{m,m}$$

$$H_{carrier} = \begin{bmatrix} H_{pvt} & I_m & -I_m & I_m \end{bmatrix}_{m,4+3m}$$

Overall:

$$Z = \begin{bmatrix} Z_{code} \\ Z_{carrier} \end{bmatrix}_{2m}$$

$$R = \begin{bmatrix} R_{code} & 0 \\ 0 & R_{carrier} \end{bmatrix}_{2m,2m}$$

-continued $$H = \begin{bmatrix} H_{code} \\ H_{carrier} \end{bmatrix}_{2m,4+3m}$$

NB: $[\ ]_{u,v}$ signifies matrix of dimension u×v (i.e. u rows and v columns)

Definitions and Notation:
∞: very large values compared with the orders of magnitude used
$O_m$: zero matrix of dimension m·m
$I_m$: identity matrix of dimension m·m
dx, dy, dz: errors in the estimated position of the receiver in the geographical reference frame,
dt: time bias of the clock of the receiver
ΔT: sampling period ($=t_{n+1}-t_n$)
$\tau_{iono}$: correlation period of the ionospheric error,
$\tau_{tropo}$: correlation period of the tropospheric error,
$\tau_{iono}$: propagation noise of the (first-order) Markov model of the ionospheric error,
$\tau_{tropo}$: propagation noise of the (first-order) Markov model of the tropospheric error.
$\tau_{code}$: standard deviation of the code phase measurement error
$\tau_{carrier}$: standard deviation of the carrier phase measurement error $$\sigma_{code} = \frac{1}{\rho}\sqrt{\frac{B_{code}}{2S/N}\left(1 + \frac{B_{FI}}{S/N}\right)}$$

$$\sigma_{carrier} = \frac{\lambda}{2\pi}\sqrt{\frac{B_{carrier}}{S/N}\left(1 + \frac{B_{FI}}{2S/N}\right)}$$

$B_{code}$: equivalent noise band of the code loop (monolateral)
$B_{carrier}$: equivalent noise band of the carrier loop (monolateral)
$B_{FI}$: predetection band
ρ: parameter characterizing the precision of the code measurement as a function of the modulation used and of the bandwidth of the receiver B—Dual-frequency Absolute Mode (Second Configuration of the Receiver According to the Invention)

Propagation Model:

Ambiguity of the carrier phases on L1:

$$X_{ambL1} = \begin{bmatrix} b_{phaseL11} \\ \vdots \\ b_{phaseL1m} \end{bmatrix}_m$$

$$F_{ambL1} = \begin{bmatrix} 1 & 0 & 0 \\ 0 & - & 0 \\ 0 & 0 & 1 \end{bmatrix}_{m,m}$$

$$Q_{ambL1} = \begin{bmatrix} 0_m \end{bmatrix}_{m,m}$$

Ambiguity of the carrier phases on L2:

$$X_{ambL2} = \begin{bmatrix} b_{phaseL21} \\ \vdots \\ b_{phaseL2m} \end{bmatrix}_m$$

$$F_{ambL2} = \begin{bmatrix} 1 & 0 & 0 \\ 0 & - & 0 \\ 0 & 0 & 1 \end{bmatrix}_{m,m}$$

$$Q_{ambL2} = \begin{bmatrix} 0_m \end{bmatrix}_{m,m}$$

Overall:

$$X = \begin{bmatrix} X_{pvt} \\ X_{ambgL1} \\ X_{ambgL2} \\ X_{iono} \\ X_{tropo} \end{bmatrix}_{4+3m}$$

$$F = \begin{bmatrix} F_{pvt} & 0 & 0 & 0 & 0 \\ 0 & F_{ambgL1} & 0 & 0 & 0 \\ 0 & 0 & F_{ambgL2} & 0 & 0 \\ 0 & 0 & 0 & F_{iono} & 0 \\ 0 & 0 & 0 & 0 & F_{tropo} \end{bmatrix}_{4+4m,4+4m}$$

$$Q = \begin{bmatrix} Q_{pvt} & 0 & 0 & 0 & 0 \\ 0 & Q_{ambL1} & 0 & 0 & 0 \\ 0 & 0 & Q_{ambL2} & 0 & 0 \\ 0 & 0 & 0 & Q_{iono} & 0 \\ 0 & 0 & 0 & 0 & Q_{tropo} \end{bmatrix}_{4+4m,4+4m}$$

Observation Model:

Code observation on L1:

$$Z_{codeL1} = \begin{bmatrix} (PD\_C\_L1_1 - PD\,e_1) \\ \vdots \\ (PD\_C\_L1_m - PD\,e_m) \end{bmatrix}_m$$

$$R_{codeL1} = \begin{bmatrix} \sigma^2_{codeL11} & 0 & 0 \\ 0 & - & 0 \\ 0 & 0 & \sigma^2_{codeL1m} \end{bmatrix}_{m,m}$$

$$H_{codeL1} = \begin{bmatrix} H_{pvt} & 0_m & 0_m & I_m & I_m \end{bmatrix}_{m,4+3m}$$

Carrier observation on L1:

$$Z_{carrierL1} = \begin{bmatrix} (PD\_PH\_L1_1 - PD\,e_1) \\ \vdots \\ (PD\_PH\_L1_m - PD\,e_m) \end{bmatrix}_m$$

$$R_{carrierL1} = \begin{bmatrix} \sigma^2_{carrierL1\,1} & 0 & 0 \\ 0 & - & 0 \\ 0 & 0 & \sigma^2_{carrierL1\,m} \end{bmatrix}_{m,m}$$

$$H_{carrierL1} = \begin{bmatrix} H_{pvt} & I_m & 0_m & -I_m & I_m \end{bmatrix}_{m,4+3m}$$

Code observation on L2:

$$Z_{codeL2} = \begin{bmatrix} (PD\_C\_L2_1 - PD\,e_1) \\ \vdots \\ (PD\_C\_L2_m - PD\,e_m) \end{bmatrix}_m$$

$$R_{codeL2} = \begin{bmatrix} \sigma^2_{codeL2\,1} & 0 & 0 \\ 0 & - & 0 \\ 0 & 0 & \sigma^2_{codeL2\,m} \end{bmatrix}_{m,m}$$

$$H_{codeL2} = \begin{bmatrix} H_{pvt} & 0_m & 0_m & \mu \cdot I_m & I_m \end{bmatrix}_{m,4+4m}$$

Carrier observation on L2:

$$Z_{carrierL2} = \begin{bmatrix} (PD\_PH\_L2_1 - PD\,e_1) \\ \vdots \\ (PD\_PH\_L2_m - PD\,e_m) \end{bmatrix}_m$$

$$R_{carrierL2} = \begin{bmatrix} \sigma^2_{carrierL2\,1} & 0 & 0 \\ 0 & - & 0 \\ 0 & 0 & \sigma^2_{carrierL2\,m} \end{bmatrix}_{m,m}$$

$$H_{carrierL2} = \begin{bmatrix} H_{pvt} & 0_m & I_m & -\mu \cdot I_m & I_m \end{bmatrix}_{m,4+4m}$$

Overall:

$$Z = \begin{bmatrix} Z_{codeL1} \\ Z_{codeL2} \\ Z_{carrierL1} \\ Z_{carrierL2} \end{bmatrix}_{2m}$$

$$R = \begin{bmatrix} R_{codeL1} & 0 & 0 & 0 \\ 0 & R_{codeL2} & 0 & 0 \\ 0 & 0 & R_{carrierL1} & 0 \\ 0 & 0 & 0 & R_{carrierL2} \end{bmatrix}_{2m,2m}$$

$$H = \begin{bmatrix} H_{codeL1} \\ H_{codeL2} \\ H_{carrierL1} \\ H_{carrierL2} \end{bmatrix}_{2m,4+3m}$$

Definitions:

$\mu$: ratio of the ionospheric errors $L_2/L_1$ $\mu = (\text{frequency } L_1)^2/(\text{frequency } L_2)^2$ C—Dual-frequency Absolute Mode with Upstream Correction (Second Configuration of the Receiver According to the Invention)

Propagation Model:

Ambiguity of the carrier phases on $L1$:

$$X_{ambL1L2} = \begin{bmatrix} b_{phaseL1L2\,1} \\ \vdots \\ b_{phaseL1L2\,m} \end{bmatrix}_m$$

$$F_{ambL1L2} = \begin{bmatrix} 1 & 0 & 0 \\ 0 & - & 0 \\ 0 & 0 & 1 \end{bmatrix}_{m,m}$$

$$Q_{ambL1L2} = \begin{bmatrix} 0_m \end{bmatrix}_{m,m}$$

Overall:

$$X = \begin{bmatrix} X_{pvt} \\ X_{ambgL1L2} \\ X_{tropo} \end{bmatrix}_{4+2m}$$

$$F = \begin{bmatrix} F_{pvt} & 0 & 0 \\ 0 & F_{ambgL1L2} & 0 \\ 0 & 0 & F_{tropo} \end{bmatrix}_{4+2m,4+2m}$$

$$Q = \begin{bmatrix} Q_{pvt} & 0 & 0 \\ 0 & Q_{ambL1L2} & 0 \\ 0 & 0 & Q_{tropo} \end{bmatrix}_{4+2m,4+2m}$$

Observation Model:

Code observation on L1L2:

$$Z_{codeL1L2} = \begin{bmatrix} (PD\_C\_L1L2_1 - PDe_1) \\ (PD\_C\_L1L2_m - PDe_m) \end{bmatrix}_m$$

$$R_{codeL1L2} = \begin{bmatrix} \sigma^2_{codeL1L2\,1} & 0 & 0 \\ 0 & - & 0 \\ 0 & 0 & \sigma^2_{codeL1L2\,m} \end{bmatrix}_{m,m}$$

$$H_{codeL1L2} = \begin{bmatrix} H_{pvt} & 0_m & I_m \end{bmatrix}_{m,4+2m}$$

Carrier observation on L1L2:

$$Z_{carrierL1L2} = \begin{bmatrix} (PD\_PH\_L1L2_1 - PDe_1) \\ \vdots \\ (PD\_PH\_L1L2_m - PDe_m) \end{bmatrix}_m$$

$$R_{carrierL1L2} = \begin{bmatrix} \sigma^2_{carrierL1L21} & 0 & 0 \\ 0 & - & 0 \\ 0 & 0 & \sigma^2_{carrierL1L2m} \end{bmatrix}_{m,m}$$

$$H_{carrierL1L2} = \begin{bmatrix} H_{pvt} & I_m & I_m \end{bmatrix}_{m,4+2m}$$

Overall:

$$Z = \begin{bmatrix} Z_{codeL1L2} \\ Z_{carrierL1L2} \end{bmatrix}_{2m} \quad R = \begin{bmatrix} R_{codeL1L2} & 0 \\ 0 & R_{carrierL1L2} \end{bmatrix}_{2m,2m}$$

$$H = \begin{bmatrix} H_{codeL1L2} \\ H_{carrierL1L2} \end{bmatrix}_{2m,4+2m}$$

Definitions:

$$PD\_C\_L1L2 = \left(\frac{1}{\mu-1}\right) PD\_C\_L2 + \left(\frac{\mu}{\mu-1}\right) PD\_C\_L1$$

$$PD\_PH\_L1L2 = \left(\frac{1}{\mu-1}\right) PD\_PH\_L2 + \left(\frac{\mu}{\mu-1}\right) PD\_PH\_L1$$

D—Mono-frequency Differential Mode (Third and Fourth Configuration of the Receiver According to the Invention)

Propagation Model:

Ambiguity of the carrier phases:

$$X_{amb} = \begin{bmatrix} b_{phase\ 1} \\ \vdots \\ b_{phase\ m} \end{bmatrix}_m \quad F_{amb} = \begin{bmatrix} I_m & \\ & 1 \end{bmatrix}_{m,m} \quad Q_{amb} = \begin{bmatrix} 0_m \end{bmatrix}_{m,m}$$

Overall:

$$X = \begin{bmatrix} X_{pvt} \\ X_{amb} \end{bmatrix}_{4+m}$$

$$F = \begin{bmatrix} F_{pvt} & 0 \\ 0 & F_{amb} \end{bmatrix}_{4+m,4+m}$$

$$Q = \begin{bmatrix} Q_{pvt} & 0 \\ 0 & Q_{amb} \end{bmatrix}_{4+m,4+m}$$

Observation Model:

Code observation:

$$Z_{code} = \begin{bmatrix} (PD\_C_1 - PDe_1) - CC_1 \\ \vdots \\ (PD\_C_m - PDe_m) - CC_m \end{bmatrix}_m$$

$$R_{code} = \begin{bmatrix} \sigma^2_{code\ 1} & 0 & 0 \\ 0 & - & 0 \\ 0 & 0 & \sigma^2_{code\ 2} \end{bmatrix}_{m,m}$$

$$H_{code} = \begin{bmatrix} H_{pvt} & 0_m \end{bmatrix}_{m,4+m}$$

$$H_{pvt} = \begin{bmatrix} \cos(\alpha_1) & \cos(\beta_1) & \cos(\gamma_1) & 1 \\ \vdots & \vdots & \vdots & \vdots \\ \cos(\alpha_m) & \cos(\beta_m) & \cos(\gamma_m) & 1 \end{bmatrix}_{m,4}$$

Carrier observation:

$$Z_{carrier} = \begin{bmatrix} (PD\_PH_1 - PDe_1) - CPH_1 \\ \vdots \\ (PD\_PH_m - PDe_m) - CPH_m \end{bmatrix}_m$$

$$R_{carrier} = \begin{bmatrix} \sigma^2_{carrier\ 1} & 0 & 0 \\ 0 & - & 0 \\ 0 & 0 & \sigma^2_{carrier\ m} \end{bmatrix}_{m,m}$$

$$H_{carrier} = \begin{bmatrix} H_{pvt} & I_m \end{bmatrix}_{m,4+m}$$

Overall:

$$Z = \begin{bmatrix} Z_{code} \\ Z_{carrier} \end{bmatrix}_{2m} \quad R = \begin{bmatrix} R_{code} & 0 \\ 0 & R_{carrier} \end{bmatrix}_{2m,2m} \quad H = \begin{bmatrix} H_{code} \\ H_{carrier} \end{bmatrix}_{2m,4+m}$$

Definitions:

$\cos(\alpha_i)$, $\cos(\beta_i)$, $\cos(\gamma_i)$: direction cosines of the receiver-satellite i axis (or line-of-sight axes) in the geographical reference frame $\sigma_{code\ i}$: standard deviation of the error in the measurement of the code phase specific to the receiver (thermal noise+multipath)*

$\sigma_{carrier\ i}$: standard deviation of the error in the measurement of the carrier phase specific to the receiver (thermal noise+multi-path)*

(*) in differential mode, it is necessary to take into account the errors in the differential corrections. For this purpose we take:

$$(\sigma_{code})^2 = (\sigma_{code\ mobile\ receiver})^2 + (\sigma_{code\ reference\ receiver})^2$$

$$(\sigma_{carrier})^2 = (\sigma_{carrier\ mobile\ receiver})^2 + (\sigma_{carrier\ reference\ receiver})^2$$

E—Application of the Position Correction $$X_{n/n} = \begin{bmatrix} dL \\ dG \\ dh \\ dt \\ X_{ambg} \\ X_{iono} \\ X_{tropo} \end{bmatrix}_{4+3m} \quad Cor_n = \begin{bmatrix} dL \\ dG \\ dh \end{bmatrix}_3 \quad X_{n/n\ corrected} = \begin{bmatrix} 0 \\ 0 \\ 0 \\ dt \\ X_{ambg} \\ X_{iono} \\ X_{tropo} \end{bmatrix}_{4+3m}$$

F—GNSS/INS Hybridization

Propagation Model:

Inertial errors:

$$X_{inertia} = \begin{bmatrix} dL \\ dG \\ dh \\ dVn \\ dVe \\ DVv \\ d\theta n \\ d\theta e \\ d\theta v \\ b_{acc}x \\ b_{acc}y \\ b_{acc}z \\ b_{gyr}z \\ b_{gyr}x \\ b_{gyr}y \\ b_{gyr}z \end{bmatrix}_{15}$$

$$F_{INS} = \begin{bmatrix} F_{inertia} \end{bmatrix}_{15,15} \quad Q_{pvt} = \begin{bmatrix} Q_{inertia} \end{bmatrix}_{15,15}$$

Position and time:

$$X_{pvt} = \begin{bmatrix} X_{inertia} \\ dt \end{bmatrix}_4$$

$$F_{pvt} = \begin{bmatrix} F_{inertia} & 0 \\ 0 & 1 \end{bmatrix}_{4,4}$$

$$Q_{pvt} = \begin{bmatrix} Q_{inertia} & 0 \\ 0 & q_{clock} \end{bmatrix}_{4,4}$$

Definitions:

dL, dG, dh: errors in the estimated position in latitude, longitude, altitude dVn, dVe, dVv: errors in the estimated speed in North, East, Vertical axes dθn, dθe, dθv: errors in the attitude of the carriers, estimated according to the North, East, Vertical axes $b_{acc}x, b_{acc}y, b_{acc}y$: biases of the accelerometers in the carrier axis $d_{gyr}x, d_{gyr}y, d_{gyr}y$: drifts of the gyrometers in the carrier axis The propagation matrix $F_{inertia}$ and covariance matrix of the propagation noise $Q_{inertia}$ are derived on the basis of the characteristics of the inertial sensors and the integration algorithm producing the attitudes, inertial speed and position, according to the state of the art of Kalman filter-based GPS inertia hybridization.

G—Initialization of the Filter at the Start

State vector:

$$X_0 \begin{bmatrix} 0_{4+3m} \end{bmatrix}_{4+3m,4+3m}$$

State covariance matrix:

$$P_{0pvt} = \begin{bmatrix} \infty & 0 & 0 & 0 \\ 0 & \infty & 0 & 0 \\ 0 & 0 & \infty & 0 \\ 0 & 0 & 0 & \infty \end{bmatrix}_{4,4} \quad P_{0amb} = \begin{bmatrix} \infty & 0 & 0 \\ 0 & \infty & 0 \\ 0 & 0 & \infty \end{bmatrix}_{m,m}$$

$$P_{0iono} = \begin{bmatrix} \sigma^2_{iono\ 1} & 0 & 0 \\ 0 & \vdots & 0 \\ 0 & 0 & \sigma^2_{iono\ m} \end{bmatrix}_{m,m}$$

$$P_{0tropo} = \begin{bmatrix} \sigma^2_{tropo\ 1} & 0 & 0 \\ 0 & \vdots & 0 \\ 0 & 0 & \sigma^2_{tropo\ m} \end{bmatrix}_{m,m}$$

$$P_0 = \begin{bmatrix} P_{0pvt} & 0 & 0 & 0 \\ 0 & P_{0ambg} & 0 & 0 \\ 0 & 0 & P_{0iono} & 0 \\ 0 & 0 & 0 & P_{0tropo} \end{bmatrix}_{4+3m,4+3m}$$

Definitions:

$\sigma_{iono\ i}$: standard deviation of the ionospheric error in the line-of-sight axis of satellite i $\sigma_{tropo\ i}$: standard deviation of the tropospheric error in the line-of-sight axis of satellite i These values are given by models of the atmosphere, as a function of the inclination of the satellite axis, the latitude of the receiver, and the time of day.

H—Appearance and Disappearance of Satellites

Disappearance of a Satellite

In the case of a definitive disappearance of a satellite due for example to masking by the earth. The number of satellite m decreases by 1, and all the terms relating to the ambiguity of the carrier phases, to the ionospheric error and to the tropospheric error pertaining to the satellite that has disappeared are deleted from the vector X and the matrices P, F and Q (including the nondiagonal coefficients representing the cross-correlation with the other satellites). The two rows and the three (or four) columns of the matrix H that are associated with the satellite that has disappeared are also deleted (just as the code and carrier observations disappear from the vector Z).

In the case of a provisional disappearance of a satellite due for example to masking by an obstacle, to the motion of the carrier or to interference, all the terms are preserved except the two rows and the three (or four) columns of the matrix H that are associated with the satellite that has disappeared and which are provisionally deleted from the vector Z, just like the observations.

Appearance of a Satellite

In the case of a reappearance of a satellite, the two rows and the three (or four) columns of the matrix H that are associated with the new satellite are restored (just as the code and carrier observations reappear in the vector Z). The phase ambiguity term of the vector X is reinitialized to 0. The diagonal coefficient associated with the phase ambiguity in the matrix P is reinitialized to ∞, that is to say a very large value compared with the commonly used orders of magnitude. In the matrix P, the new diagonal coefficient associated with the tropospheric error in the matrix P is initialized to $\sigma^2_{tropo\ i}$ and the new diagonal coefficient associated with the ionospheric error in the matrix P is initialized to $\sigma^2_{iono\ i}$. The nondiagonal coefficients associated with the phase ambiguity are initialized to 0.

In the case of an appearance of a new satellite. The number m of satellites seen increases by 1. A new phase ambiguity term of the vector X is initialized to 0. A new diagonal coefficient associated with the phase ambiguity in the matrix P is initialized to ∞. New nondiagonal coefficients associated with the phase ambiguity in the matrix P are initialized to 0. Terms relating to the ionospheric error and to the tropospheric error of the new satellite are added into the matrices F and Q. The two rows and the three (or four) columns of the matrix H that are associated with the new satellite are added (just as the code and carrier observations appear in the vector Z).

The invention claimed is:

1. A satellite-based positioning receiver, comprising several digital signal processing channels each intended to be associated with a respective satellite and each providing a first digital datum representing a pseudo-distance between the receiver and the satellite calculated on the basis of an instantaneous phase of a pseudo-random code present in the signal transmitted by the satellite and a second digital datum representing this pseudo-distance calculated on the basis of an instantaneous phase of the carrier of the signal transmitted by the satellite, comprising an:

extended Kalman filter including:
 means for calculating a position of the receiver in a terrestrial reference frame on the basis of a previously calculated position and of an error in this position;
 means for calculating propagation of an estimated state vector comprising the error in the calculated position of the receiver, on the basis of a matrix propagation equation involving a propagation matrix,
 means for calculating registration of the state vector on the basis of observations relating to each satellite and of a matrix of observations relating the state vector and the observations,
 means for calculating observations, receiving the first and the second digital datum to calculate an estimated pseudo-distance between the receiver and each satellite, so as to establish observations to be applied to the input of the registration calculation means;
 means for calculating an estimated pseudo-distance for each satellite, by calculating the distance between the calculated position of the receiver in the terrestrial reference frame and each satellite;
 wherein the means for calculating observations comprise means for subtracting the estimated pseudo-distance from the first and from the second digital datum and applying the result of the subtraction to the input of the registration calculation means;
 wherein the matrix propagation equation brings into the state vector a component representing the ambiguity of the measurement of the carrier pseudo-distance, per satellite; and
 wherein calculating registration of the state vector on the basis of observations is based on a code pseudo-distance observation and a carrier pseudo-distance observation.

2. The receiver as claimed in claim 1, wherein the matrix propagation equation brings into the state vector a component representing an error related to the propagation of the signal in the ionosphere, per satellite.

3. The receiver as claimed in claim 1, wherein the matrix propagation equation brings into the state vector at least one component representing an error related to the propagation of the carrier in the troposphere, per satellite.

4. The receiver as claimed in claim 1, wherein each channel associated with a satellite comprises two sub-channels, receiving signals at different carrier frequencies from this satellite, the sub-channels producing respective instantaneous pseudo-distances and the first and the second digital data being linear combinations of these pseudo-distances.

5. The receiver as claimed in claim 1, wherein each channel associated with a satellite comprises two sub-channels, receiving signals at different carrier frequencies from this satellite, each of the sub-channels, producing respective instantaneous pseudo-distances which are all applied, in the form of first and second digital data respectively, to the input of the means for calculating observations.

6. The receiver as claimed in claim 1, wherein the Kalman filter constitutes a main filter providing a position calculated in the terrestrial reference frame on the basis of observations made on m satellites identified by their rank i (i integer from 1 to m), and in that the receiver moreover comprises m auxiliary Kalman filters of rank i, an auxiliary filter of rank i receiving the signals from all the satellites with the exception of the satellite of rank i.

7. The receiver as claimed in claim 6, comprising means for calculating a protection radius on the basis of the outputs of the various Kalman filters and means for verifying that this protection radius does not exceed a determined threshold.

8. The receiver as claimed in claim 1, wherein each digital processing channel associated with a satellite and processing the signals transmitted by this satellite furthermore receives from a reference positioning receiver placed in a ground station, a first code phase correction and a second carrier phase correction that relate to this satellite, so as to formulate respectively the first and the second digital data by taking account of these corrections.

9. The receiver as claimed in claim 1, for a relative position measurement, wherein each digital processing channel associated with a satellite and processing the signals transmitted by this satellite furthermore receives from a mobile reference positioning receiver a correction consisting of a measured pseudo-distance between the satellite and the reference positioning receiver, so as to formulate respectively the first and the second digital datum by differences of the pseudo-distances and in that the cue delivered by the receiver is a relative position with respect to the mobile reference receiver.

10. The receiver as claimed in claim 8, comprising, other Kalman filters termed auxiliary filters of rank j, j integer varying from 1 to M, and M greater than 1, and in that each digital processing channel receives corrections from M reference receivers, and calculates:

an average of the M first corrections and an average of the M second corrections, these averages serving as corrective terms to formulate the first and second digital data for the main filter for each rank j, an average of M−1 first corrections and an average of M−1 second corrections, excluding the corrections arising from the receiver of rank j, these averages serving as corrective terms to formulate the first and second digital data for the filter of rank j.

11. The receiver as claimed in claim 10, comprising means for calculating a protection radius on the basis of the outputs of the various Kalman filters and means for verifying that this protection radius does not exceed a determined threshold.

12. The receiver as claimed in claim 8, comprising means for calculating a protection radius on the basis of the outputs of a single Kalman filter supplied with M observations composed of the differences between a vector of main observations whose m components are equal to the arithmetic average of the M observations by the M reference receivers and the M vectors of average observations whose m components are equal to the arithmetic average of M−1 observations by the reference receivers, and means for verifying that this protection radius does not exceed a determined threshold.

13. The receiver as claimed in claim 1, wherein the matrix propagation equation brings into the state vector a component representing the ambiguity of the measurement of the carrier pseudo-distance, per satellite.

14. The receiver as claimed in claim 1, wherein the matrix propagation equation brings into the state vector a component representing an error related to the propagation of the signal in the ionosphere, per satellite.

15. The receiver as claimed in claim 1, wherein the matrix propagation equation brings into the state vector at least one component representing an error related to the propagation of the carrier in the troposphere, per satellite.

16. The receiver as claimed in claim 1, wherein each channel associated with a satellite comprises two sub-channels, receiving signals at different carrier frequencies from this satellite, each of the sub-channels, producing respective instantaneous pseudo-distances which are all applied, in the form of first and second digital data respectively, to the input of the means for calculating observations.

17. The receiver as claimed in claim 1, wherein the Kalman filter constitutes a main filter providing a position calculated in the terrestrial reference frame on the basis of observations made on m satellites identified by their rank i (i integer from 1 to m), and in that the receiver moreover comprises m auxiliary Kalman filters of rank i, an auxiliary filter of rank i receiving the signals from all the satellites with the exception of the satellite of rank i.

18. The receiver as claimed in claim 1, for a relative position measurement, wherein each digital processing channel associated with a satellite and processing the signals transmitted by this satellite furthermore receives from a mobile reference positioning receiver a correction consisting of a measured pseudo-distance between the satellite and the reference positioning receiver, so as to formulate respectively the first and the second digital datum by differences of the pseudo-distances and in that the cue delivered by the receiver is a relative position with respect to the mobile reference receiver.

19. The receiver as claimed in claim 9, comprising, other Kalman filters termed auxiliary filters of rank j, j integer varying from 1 to M, and M greater than 1, and in that each digital processing channel receives corrections from M reference receivers, and calculates:

an average of the M first corrections and an average of the M second corrections, these averages serving as corrective terms to formulate the first and second digital data for the main filter for each rank j, an average of M−1 first corrections and an average of M−1 second corrections, excluding the corrections arising from the receiver of rank j, these averages serving as corrective terms to formulate the first and second digital data for the filter of rank j.

20. The receiver as claimed in claim 9, comprising means for calculating a protection radius on the basis of the outputs of a single Kalman filter supplied with M observations composed of the differences between a vector of main observations whose m components are equal to the arithmetic average of the M observations by the M reference receivers and the M vectors of average observations whose m components are equal to the arithmetic average of M−1 observations by the reference receivers, and means for verifying that this protection radius does not exceed a determined threshold.

* * * * *